(12) United States Patent
Anderson et al.

(10) Patent No.: US 8,437,890 B2
(45) Date of Patent: *May 7, 2013

(54) INTEGRATED FRAMEWORK FOR VEHICLE OPERATOR ASSISTANCE BASED ON A TRAJECTORY PREDICTION AND THREAT ASSESSMENT

(75) Inventors: Sterling J. Anderson, Allston, MA (US); Steven C. Peters, Cambridge, MA (US); Karl D. Iagnemma, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/254,761

(22) PCT Filed: Jul. 15, 2010

(86) PCT No.: PCT/US2010/042203
§ 371 (c)(1),
(2), (4) Date: Dec. 21, 2011

(87) PCT Pub. No.: WO2011/009011
PCT Pub. Date: Jan. 20, 2011

(65) Prior Publication Data
US 2012/0083947 A1 Apr. 5, 2012

Related U.S. Application Data

(63) Continuation-in-part of application No. 12/711,935, filed on Feb. 24, 2010, and a continuation-in-part of application No. PCT/US2010/025206, filed on Feb. 24, 2010.

(60) Provisional application No. 61/270,933, filed on Jul. 15, 2009, provisional application No. 61/209,250, filed on Mar. 5, 2009.

(51) Int. Cl.
*G05D 1/00* (2006.01)
*G01C 22/00* (2006.01)

(52) U.S. Cl.
USPC .............................................. 701/3; 701/23

(58) Field of Classification Search ................ 701/3, 45
See application file for complete search history.

(56) References Cited

U.S. PATENT DOCUMENTS 5,301,101 A 4/1994 MacArthur et al.
5,742,141 A 4/1998 Czekaj (Continued)

OTHER PUBLICATIONS

B. Kim, D. Necsulescu, J. Sasiadek, "Model Predictive Control of an Autonumous Vehicle", 2001 IEEE/ASME International Conference on Advanced Intelligent Mechatronics Preceedings, Jul. 2001.*

(Continued)

*Primary Examiner* — Thomas Tarcza
*Assistant Examiner* — Alex C Dunn
(74) *Attorney, Agent, or Firm* — Hamilton, Brook, Smith & Reynolds, P.C.

(57) ABSTRACT

Various types and levels of operator assistance are performed within a unified, configurable framework. A model of the device with a model of the environment and the current state of the device and the environment are used to iteratively generate a sequence of optimal device control inputs that, when applied to a model of the device, generate an optimal device trajectory through a constraint-bounded corridor or region within the state space. This optimal trajectory and the sequence of device control inputs that generates it is used to generate a threat assessment metric. An appropriate type and level of operator assistance is generated based on this threat assessment. Operator assistance modes include warnings, decision support, operator feedback, vehicle stability control, and autonomous or semi-autonomous hazard avoidance. The responses generated by each assistance mode are mutually consistent because they are generated using the same optimal trajectory.

25 Claims, 11 Drawing Sheets

U.S. PATENT DOCUMENTS

| | | | |
|---|---|---|---|
| 6,085,151 A * | 7/2000 | Farmer et al. | 701/301 |
| 6,173,215 B1 | 1/2001 | Sarangapani | |
| 6,405,132 B1 * | 6/2002 | Breed et al. | 701/301 |
| 6,411,901 B1 * | 6/2002 | Hiwatashi et al. | 701/301 |
| 6,643,554 B2 | 11/2003 | Gough, Jr. et al. | |
| 6,775,605 B2 * | 8/2004 | Rao et al. | 701/45 |
| 6,823,675 B2 | 11/2004 | Brunell et al. | |
| 6,825,756 B2 | 11/2004 | Bai et al. | |
| 6,873,251 B2 | 3/2005 | Schiffmann et al. | |
| 6,898,528 B2 * | 5/2005 | Zorka et al. | 701/301 |
| 7,016,783 B2 | 3/2006 | Hac et al. | |
| 7,034,668 B2 | 4/2006 | Engelman et al. | |
| 7,085,637 B2 * | 8/2006 | Breed et al. | 701/38 |
| 7,102,496 B1 | 9/2006 | Ernst, Jr. et al. | |
| 7,124,027 B1 | 10/2006 | Ernst, Jr. et al. | |
| 7,138,909 B2 | 11/2006 | Winner | |
| 7,236,865 B2 * | 6/2007 | Prakah-Asante et al. | 701/45 |
| 7,250,850 B2 * | 7/2007 | Mizutani | 340/435 |
| 7,418,372 B2 * | 8/2008 | Nishira et al. | 703/2 |
| 7,512,487 B1 | 3/2009 | Golding et al. | |
| 7,599,765 B2 * | 10/2009 | Padan | 701/3 |
| 7,920,087 B2 * | 4/2011 | Ogawa | 342/70 |
| 7,966,127 B2 * | 6/2011 | Ono et al. | 701/300 |
| 7,966,276 B2 | 6/2011 | Cade | |
| 2002/0007798 A1 | 1/2002 | Pavlak et al. | |
| 2002/0022927 A1 | 2/2002 | Lemelson et al. | |
| 2003/0060980 A1 | 3/2003 | Prakah-Asante et al. | |
| 2003/0109780 A1 | 6/2003 | Coste-Maniere et al. | |
| 2003/0229552 A1 | 12/2003 | Lebaric et al. | |
| 2004/0181300 A1 | 9/2004 | Clark, Jr. et al. | |
| 2006/0184294 A1 | 8/2006 | Ma et al. | |
| 2007/0112476 A1 | 5/2007 | Obradovich | |
| 2007/0247517 A1 | 10/2007 | Zhang et al. | |
| 2008/0046150 A1 | 2/2008 | Breed | |
| 2008/0086248 A1 | 4/2008 | Lu et al. | |
| 2008/0097700 A1 | 4/2008 | Grimm | |
| 2008/0147277 A1 | 6/2008 | Lu et al. | |
| 2008/0208409 A1 | 8/2008 | Matsumoto et al. | |
| 2008/0306666 A1 | 12/2008 | Zeng et al. | |
| 2009/0174540 A1 | 7/2009 | Smith | |
| 2012/0010758 A1 * | 1/2012 | Francino et al. | 700/291 |

OTHER PUBLICATIONS

Yoshiaki Kuwata, Arthur Richards, Tom Schouwenaars, Jonathan P. How, "Decentralized Robust Receeding Horizon Control for Multi-Vehicle Guidance", Proceedings of The American Control Conference, 2006.*

Wei Xi, John S. Baras, :MPC Based Motion Control of Car-like Vehicle Swarms, 2007 Mediterranean Conference on Control and Automation, Jul. 2007.*

Sterling J. Anderson, Steven C. Peters, Karl D. Iagnemma, Tom E. Pilutti, "A unified Approach to Semi-Autonomous Control Passenger Vehicles in Harzard Avoidance Scenarios", Oct. 2009.*

Final Office Action, U.S. Appl. No. 12/711,935, dated Jan. 11, 2013.

Non-Final Office Action, U.S. Appl. No. 13/254,746, dated Nov. 14, 2012.

Notification of Transmittal of International Search Report and Written Opinion from PCT/US10/025206 dated Jun. 19, 2010.

Notification of Transmittal of International Search Report and Written Opinion from PCT/US10/42201 dated Aug. 31, 2010.

Notification of Transmittal of International Search Report and Written Opinion from PCT/US10/42203 dated Sep. 1, 2010.

Shiller, Z., Dynamic Motion Planning of Autonomous Vehicles, IEEE Transactions of Robotics and Automation, vol. 7, No. 2, Apr. 1991.

Brandt, T., "Combining Haptic Human-Machine Interaction with Predictive Path Planning for Lane Keeping and Collision Avoidance System", Proceedings of IEEE Intelligent Vehicles Symposium, Istanbul, Turkey, Juen 13-15, 2007.

Weng, L., Path Planning and Path Tracking Control of Unmanned Ground Vehicles (UGVs), Proceedings of the 37th Southeast Symposium, Mar. 20-22, 2005.

Keviczky, T., "Predictive Control Approach to Autonomous Vehicle Steering", Proceedings of the 2006 American Control Conference, Minneapolis, Minnesota, USA, Jun. 14-16, 2006.

Vahidi, A., "Research Advances in Intelligent Collision Avoidance and Adaptive Cruise Control", IEEE Transactional Intelligent Transportation Systems, vol. 4, No. 3, Sep. 2003.

Richards, A., "Robust Variable Horizon Model Predictive Control for Vehicle Maneuvering", International Journal of Robust and Nonlinear Control, 16:333-351, 2006.

Large, F., "Using Non-Linear Velocity Obstacles to Plan Motions in a Dynamic Environment", 7th International Conference of Intelligent Robots and Systems, Acropolis Convention Center, Nice, France, Sep. 22-26, 2008.

Iagnemma, K. "Near-Optimal Navigation of High Speed Mobile Robots on Uneven Terrain", IEEE/RSJ International Conference on Intelligent Robots and Systems, Acropolis Convention Center, Nice, France, Sep. 22-26, 2008.

Carlson, C., Optimal Rollover Prevention with Street by Wire and Differential Braking, Proceedings of the IMECE '03 ASME International Mechanical Engineering Congress and Exposition, Washington, USA, November.

* cited by examiner

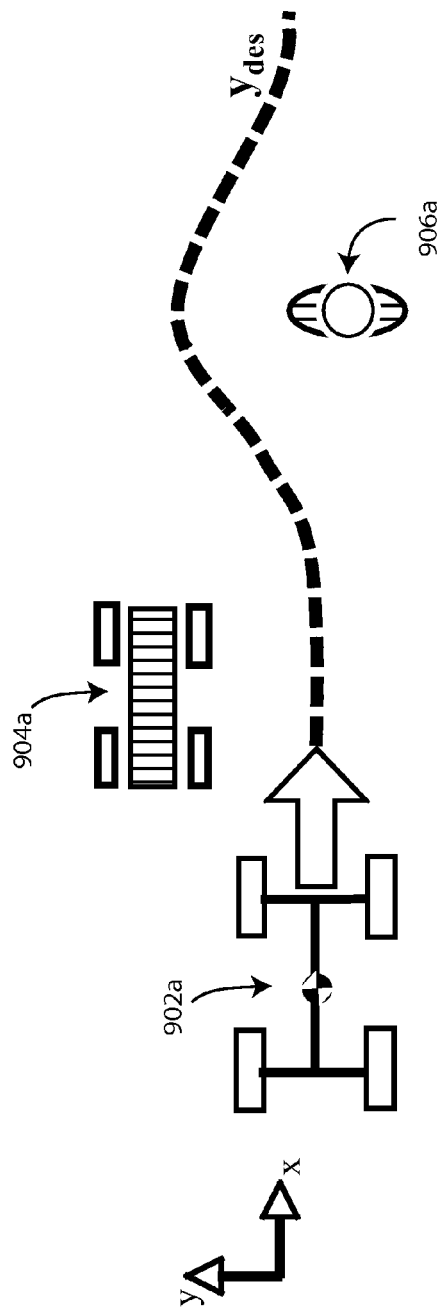
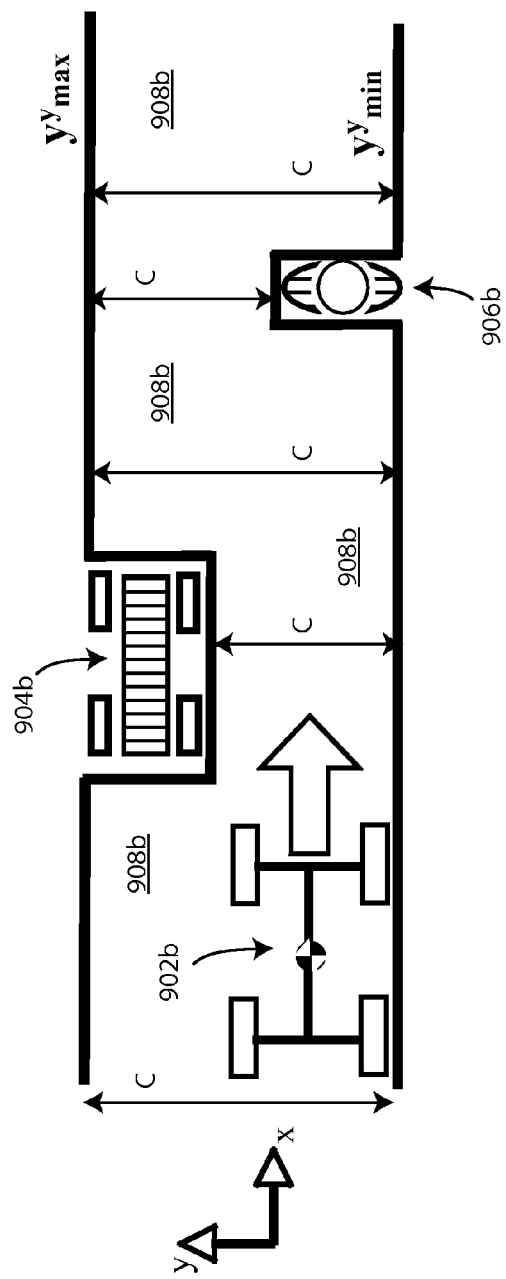
Fig. 9a (prior art)
Fig. 9b

INTEGRATED FRAMEWORK FOR VEHICLE OPERATOR ASSISTANCE BASED ON A TRAJECTORY PREDICTION AND THREAT ASSESSMENT

RELATED DOCUMENT

Priority is hereby claimed to: U.S. Provisional application No. 61/270,933, entitled SEMI-AUTONOMOUS CONTROL OF PASSENGER VEHICLES, in the names of Sterling J. Anderson, Steven C. Peters and Karl D. Iagnemma, filed on Jul. 15, 2009, referred to herein below as the Comprehensive Provisional patent application; and this is a continuation-in-part of, and priority is hereby claimed to U.S. patent application Ser. No. 12/711,935, PREDICTIVE SEMI-AUTONOMOUS VEHICLE NAVIGATION SYSTEM, in the names of Sterling J. Anderson, Steven C. Peters and Karl D. Iagnemma, filed on Feb. 24, 2010; and this is a continuation-in-part of, and priority is hereby claimed to International Application No. PCT/US2010/025206, PREDICTIVE SEMI-AUTONOMOUS VEHICLE NAVIGATION SYSTEM, in the names of Sterling J. Anderson, Steven C. Peters and Karl D. Iagnemma, filed on Feb. 24, 2010, designating the United States, both of which claim priority to U.S. Provisional application No. 61/209,250, entitled PREDICTIVE SEMI-AUTONOMOUS VEHICLE NAVIGATION SYSTEM, in the names of Sterling J. Anderson, Steven C. Peters and Karl D. Iagnemma, filed on Mar. 5, 2009, priority to which is also claimed herein, referred to below as the Semi-Autonomous patent applications, which are all hereby fully incorporated herein by reference. This case is also related to a PCT application that was filed on Jul. 15, 2010, in the names of Sterling J. Anderson and Steven C. Peters, and Karl D. Iagnemma, submitted by electronic filing under International Application No. PCT/US2010/042201, entitled, METHODS AND APPARATI FOR PREDICTING AND QUANTIFYING THREAT BEING EXPERIENCED BY A MODELED SYSTEM, which is hereby fully incorporated herein by reference, and is referred to herein below as the co-pending Threat Assessment application.

BACKGROUND

Inventions described herein relate to a novel, corridor-based framework that performs threat assessment and provides varying degrees of mutually consistent automated operator assistance as a threat response in human-machine systems, such as locally or remotely-operated passenger vehicles, transport vehicles, agricultural machinery, fork lift trucks, aerial vehicles, robots, or surgical tools. This framework explicitly considers human and machine dynamics without presuming operator intentions or limiting the avoidance maneuver (and its associated threat assessment) to a specific path. It provides a unified framework that allows for various modes and levels of mutually consistent operator assistance, from operator warning to stability control to passive intervention, to active semi-autonomous control, and finally, to autonomous machine operation.

Automotive active safety systems are concerned with preventing accidents through the introduction of various computer-controlled actuation methods to inform, improve, or override a human operator's steering and/or braking performance. Active safety systems currently in existence include yaw stability control, roll stability control, traction control, and antilock braking, among others. While these systems reduce accident frequency, their path-based and largely reactive nature limits their ability to: 1) accurately assess the threat posed by a given scenario and 2) adequately determine when and how to intervene to assist the driver. This dependence on a specific trajectory (amidst a myriad of options available to the operator) reduces the accuracy and significance of the threat assessment and leads to controllers that selectively replace (rather than assist) the driver in order to follow an automation-designated path.

The inventions described and claimed herein relate, primarily, to the unified nature of the framework, and its flexibility in being able to accurately assess threat, and then participate in one or more of a wide variety of mutually consistent operator assistance modes, of varying levels of operator autonomy, from complete autonomy, to no autonomy. Inventions described and claimed in the Threat assessment application relate primarily to threat assessment aspects of this novel framework. Both have similar disclosures.

A basic premise of threat assessment for such assisted and automated systems is generally as follows. First, sensing systems such as radar, LIDAR, cameras, inertial measurement units and GPS localization systems are used to detect, classify, and track the position of objects and the drivable road surface in the host vehicle's vicinity as well as measure vehicle states. Once these potential hazards have been identified, localized and their motion has been estimated, a threat metric is used to quantify the threat they pose to the host vehicle, together with the threat of departing the drivable road surface due to loss of vehicle control. As used herein, threat assessment or threat prediction is used to mean identifying hazards and quantifying threat. Many threat assessment technologies are designed to then trigger and/or implement countermeasures to reduce the threat. These countermeasures can be passive or active. The effectiveness of threat assessment metrics depends on their ability to correctly identify hazards and accurately assess the threat that potential hazards pose to the host vehicle.

Threat metrics described in the literature predominantly use time-based, distance-based, and deceleration-based measures to characterize the threat level of a given scenario. Time-based threat measures project time to collision (TTC) based on current speeds, positions, trajectories, and (in some formulations) other vehicle states. Distance-based metrics are generally calculated using prevailing range and vehicle speeds and require constant velocity/acceleration assumptions and simple hazard geometry. Finally, acceleration-based metrics assess the threat of a given maneuver based on the minimum (and often assumed constant) lateral or longitudinal acceleration that a simple avoidance maneuver would require, given the current position, velocity, and acceleration of both host and hazard. In another approach, estimate is made of the lateral acceleration required to execute a constant radius evasive maneuver. That implementation then compares this acceleration to a threshold value. When the required acceleration reaches this threshold, braking countermeasures are implemented to reduce the vehicle's longitudinal velocity.

While the above threat metrics have been shown to provide useful estimates of the danger posed by a given maneuver, they suffer from many drawbacks. They are not well suited to consider multiple hazards, complex vehicle dynamics, or complicated environmental geometry with its attendant constraints. The geometrically-simple (straight-line or constant-radius-turn (CRT)) avoidance maneuvers assumed by these metrics may also misestimate the true threat posed by scenarios where the optimal avoidance trajectory follows a curve of varying radius or non-constant velocity/acceleration.

At least one known method of assessing threat relates to a vehicle that is intended to navigate along a path. The path may be predetermined, or calculated, based on data, such as information about obstacles and a path followed by a track, such as a roadway in the case of a road vehicle, such as an automobile. The path is a curve of simple geometry, having essentially no width. If the vehicle deviates from the zero width path, the system determines that danger has arisen, and the system generates a threat signal. However, in fact, the threat of actual danger is potentially low, because vehicles driven by a human operator typically operate within a field of safe travel, or a corridor, rather than along a relatively arbitrary line, such as the centerline of a roadway. This dependence on a specific trajectory (amidst a myriad of options available to the operator) reduces the accuracy and significance of the threat assessment and leads to controllers that selectively replace (rather than assist) the driver in order to follow an automation-designated path.

The following terms will be used herein as follows. A path is a simple geometric curve in two-dimensional space, along which a vehicle may travel. The path, in x-y space may be defined by a function, $y=f(x)$. A path has a width of essentially zero. A trajectory is a physically-achievable and time-parameterized sequence of vehicle states (such as velocity, yaw angle, wheel sideslip angle, etc.) over a time horizon, By physically-achievable, it is meant that for every trajectory, there exists a set of controller inputs, such as braking torque and steering angle, that when applied to a model of the vehicle produce the desired trajectory. It has been mentioned that the trajectory includes the velocity of a vehicle as an element. It may also be thought of as having time as a parameter of the path, which may then establish velocity at different locations.

A corridor is a swath through two-dimensional space, which may be defined by an inequality $y_{min}<y<y_{max}$, where each of $y_{min}$ and $y_{max}$ are themselves defined by $y_{max}=g(x)$ and $y_{min}=h(x)$. Thus, a corridor may be considered to be the space between two curves in two-dimensional space. Travel anywhere within the corridor is considered to be safe. A region is a concept that is defined in connection with inventions hereof, and it will be defined below.

A Model Predictive Controller (MPC) is an optimal control method typically used to generate an optimal set of control inputs (spanning through a future time horizon) required to track a desired path while minimizing a user-defined objective function. In typical usage, only the first element of this command input sequence is implemented at each solution timestep and the remainder are disregarded.

A human driver typically operates a vehicle within a safe range of vehicle states. For example, the driver typically maintains the vehicle's position on the roadway (lateral position state) within the corridor defined by road or lane edges. Similarly, other states such as vehicle velocity, lateral acceleration, etc. provide some indication of threat to the driver, who (consciously or subconsciously) seeks to keep them within a safe operating range (or between upper and lower bounds). Depending on the driving conditions, posted speed limits, and other factors, for example, a driver may allow vehicle velocity to vary between 53 and 70 miles per hour rather than slavishly maintaining 55 miles per hour along a roadway. Likewise with vehicle sideslip, which the driver will typically strive to maintain within a reasonable (or safe) range. Thus, a human operator operates within an N-dimensional region of state space, rather than along a simple, zero, or nearly-zero width curve of a physical trajectory.

In many cases, it may be desirable to assess threat based on a realistic roadway corridor than an unrealistic single path on the roadway. Similarly, it may also be desirable to assess threat based on a realistic N-dimensional region of state space (as explained more fully below, which includes as a portion, the two-dimensional corridor).

Some known threat assessors exist as a separate system, not integrated with other systems of the device analysis and control apparatus. These systems may base the assessment of threat on a device state exceeding a relatively arbitrary threshold. Further, these threat assessors typically do not provide the control input necessary to decrease the threat they've assessed.

Other threat assessment approaches use only rudimentary threat assessment metrics based on, for example, the current deviation of the device from a predetermined optimal path. It would be desirable to be able to take advantage of predicted future states of the device in assessing threat.

Still other threat assessment approaches also do not consider combined effects of vehicle dynamics, stability constraints and terrain interactions to evaluate maneuver severity. However, it would be desirable to be able to consider these matters in threat assessment.

Thus, an object of inventions disclosed in the Threat Assessment application is to take advantage of predicted future states and predicted future optimal inputs to assess threat. A further object would be to be able to consider combined effects of vehicle dynamics, stability constraints and terrain interactions to evaluate maneuver severity in assessing threat. Still another object would be to be able to assess threat on a realistic corridor, rather than an unrealistic single path. Another object would be to assess threat with an apparatus that is integrated with other systems of system analysis and control, which are also used to control the device or system, rather than assessing threat on a device state exceeding an arbitrary threshold. Still another object would be to use the assessment of threat to generate an operator assistance signal to assist the operator in safely operating the device or replace the operator as necessary to ensure safe operation of the device.

Known device control systems use distinct and sometimes competing modules to assist an operator. Thus, they often provide conflicting and inconsistent operator assistance threat responses.

These and other objects of inventions disclosed herein will be more fully explained and understood with reference to the Figures of the Drawing, which are:

BRIEF DESCRIPTION OF THE FIGURES OF THE DRAWING

FIG. 9a shows, schematically, an illustration of a simple path tracking control set up of the prior art;

FIG. 9b shows, schematically, a corridor keeping control set up, using position constraint y=f(x) for static hazards;

DETAILED DESCRIPTION

Figure 1:
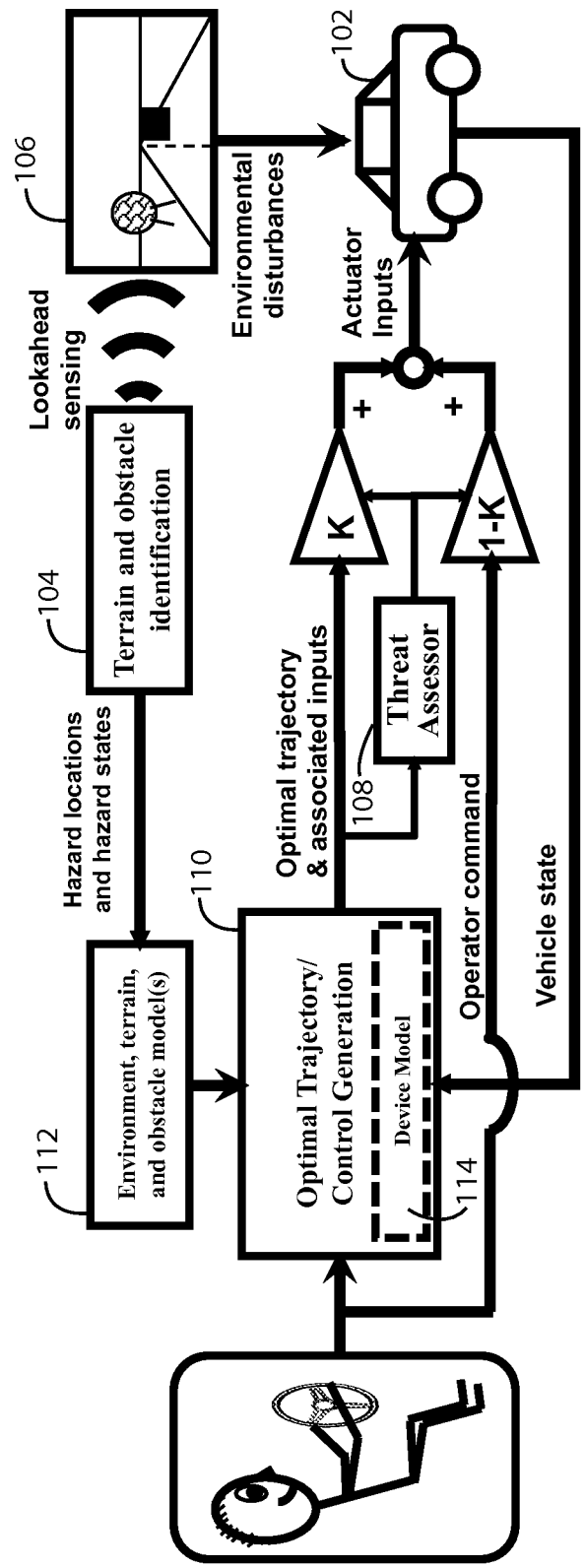
FIG. 1 is a block diagram illustrating basic framework operation.

Inventions described in the above-referenced Semi-Autonomous applications, and the Comprehensive Provisional patent application, relate, among other things, to a unified framework for performing threat assessment and semi-autonomous vehicle navigation and control while allowing for adaptable and configurable intervention laws and configurable control inputs.

Inventions described in the Threat Assessment application, and also below, relate to methods and apparati for identifying and quantifying threat being experienced by a system that can be modeled, such as a vehicle, such as a road vehicle, such as an automobile.

To summarize briefly inventions hereof, various types and levels of operator assistance are performed within a unified, configurable framework. A model of the device with a model of the environment and the current state of the device and the environment are used to iteratively generate a sequence of optimal device control inputs that, when applied to a model of the device, generate an optimal device trajectory through a constraint-bounded corridor or region within the state space. This optimal trajectory and the sequence of device control inputs that generates it is used to generate a threat assessment metric. An appropriate type and level of operator assistance is generated based on this threat assessment. Operator assistance modes include warnings, decision support, operator feedback, vehicle stability control, and autonomous or semi-autonomous hazard avoidance. The responses generated by each assistance mode are mutually consistent because they are generated using the same optimal trajectory.

As used herein, identifying and quantifying threat will be referred to as assessing threat, or sometimes, predicting threat. Danger may also be used interchangeably with threat. The methods and apparatus for assessing threat are of the same type as can be used in the unified framework for semi-autonomous vehicle navigation and control, discussed in the applications mentioned above. Such methods and apparati can be used for assessing threat in any system that can be modeled.

In contrast to existing approaches, the inventions described herein do not rely on a subjective prediction of a path intended by a human operator or a specific path proposed by an automatic path planning algorithm. Instead, these inventions base threat assessment and operator assistance decisions on dynamic properties and known constraints inherent to the vehicle and the environment. These inventions warn of deviation from a physically-constrained and dynamically-feasible region in N space (that includes a two-dimensional corridor in physical space) rather than an arbitrarily-calculated path, which is often less meaningful since it often does not represent a true, or even achievable, much less optimal route. Further, by predictively simulating the vehicle dynamics over a time horizon, which may be finite or infinite, its threat assessment and intervention operations explicitly and preemptively consider the combined effects of vehicle dynamics, stability constraints, and terrain interaction on maneuver severity.

Turning again to definitions of some helpful terminology, a region is an N-dimensional analogue of a corridor. A region is an n-dimensional area defined in the state space of the device model over a time horizon. This region is bounded by corridor constraints (which apply to vehicle position states), together with other state constraints (such as those imposed on vehicle states such as yaw angle, yaw rate, velocity, wheel sideslip angle, etc.).

In contrast to known MPC planners, MPC planners of inventions hereof are not required to utilize a single reference path for optimal control input generation. Rather, the MPC planners of inventions hereof are capable of generating an optimal trajectory that constitutes a path through a constraint-bounded corridor or region of the state space. Thus, planners described herein generate a course of motion that need not follow a predefined path but may instead generate its own optimal trajectory (and the control inputs necessary to achieve it) at successive time steps.

Threat assessment inventions described herein may be used with any system that can be modeled, including vehicles, such as terrestrial, nautical, and aerial vehicles, manufacturing machines, chemical processes, and fully automated processes, such as nuclear power plant operations and economic processes. All such systems and devices that can be reasonably modeled, can have associated therewith conditions that threaten operator, client, or third party use and enjoyment or process effectiveness. As such, there is benefit in assessing these threatening conditions, and issuing warnings therefore, possibly enabling counter measures or other preparations. The specific implementations described herein are illustrated in the context of a terrestrial vehicle, such as an automobile. However, it is to be understood that the explanation is for illustrative purposes only, and that the inventions described herein can be used to identify and quantify (i.e., assess) threat in all systems that can be modeled. The systems may be physical, such as devices and chemical processes. They may also be non-physical, such as economic systems. In all cases, the system model will include states (such as pitch angle for an aerial vehicle, solvent concentration for a chemical system, or asset prices for a financial system) for which a desired value or range of values exists and to which constraints (such as stall limits for an aerial vehicle, saturation for a chemical process, or price caps for a financial system) may apply.

Turning then to terrestrial systems, for illustration purposes only, automotive active safety systems are concerned with preventing accidents through the introduction of various computer-controlled actuation methods to improve driver braking and steering performance. Current active safety systems include yaw stability control, roll stability control, traction control, and antilock braking, among others. While these systems reduce accident frequency, they are fundamentally reactive in nature: their intervention is based on current vehicle (and, possibly, road surface) conditions. Because they do not utilize 1) sensory information related to the vehicle surroundings or 2) a prediction of the vehicle's path through its surroundings, they have limited ability to assess the threat of impending accidents, and thus cannot exert corrective actions to avoid them.

Active navigation systems aim to avoid accidents by utilizing sensory information related to the vehicle surroundings and a prediction of a safe vehicle trajectory through those surroundings to exert appropriate actuator effort to avoid impending accidents. Sensory information would include data related to nearby vehicles, pedestrians, road edges, and other salient features to assess accident threat.

Except in cases of desired full automation, such navigation systems ideally operate only during instances of significant threat: it should give a driver full control of the vehicle in low threat situations but apply appropriate levels of computer-controlled actuator effort during high threat situations. An active navigation system can therefore be termed semi-autonomous, since it must allow for human-controlled, computer-controlled, and shared human/computer vehicle operation. Such a system should be as unobtrusive to the driver as possible (i.e. it should intervene only as much as is minimally required to avoid an impending accident).

A semi-autonomous active navigation system described in part in the above referenced Semi-Autonomous patent applications can satisfy the above requirements and desired characteristics. Further, it provides a framework into which various distinct sensing and actuation modes can be easily incorporated. The system's method for threat assessment and computer-controlled intervention can potentially be modified in real time based on the scenario, environmental conditions, driver preference, or past driver performance. FIG. 1 shows, schematically, in block diagram form, a basic framework operation.

A model Predictive Control (MPC) vehicle navigation block 110 starts with a model 112 of the environment, a model 114 of the device, in this case, a vehicle, and the vehicle's current state, including the position. It generates an optimal vehicle trajectory from the current position through a time horizon. The trajectory is optimal with respect to a pre-defined, configurable set of criteria. It also generates a corresponding optimal set of control input commands necessary to execute an optimal trajectory within the corridor and ensure that the vehicle 102 operates within safe driving limits (defined by a constraint-bounded region in the state space). The environment model can be based on a priori known information (e.g. from maps) and/or information gathered by real time sensors, such as on-vehicle sensors 104 (e.g. cameras and laser rangefinders, vehicle to vehicle (V2V sensors), and can include information 106 related to the environmental and potential environmental hazards, such as position of road edges, lane boundaries, holes, slopes, static obstacles (e.g. trees, road-side signs), and dynamic obstacles (e.g. other vehicles, pedestrians). The vehicle model is user-defined and can be of varying complexity and fidelity. The real-time sensors may also be mounted in the environment and communicate with the control system on the vehicle.

The predicted safe vehicle trajectory (and associated control inputs to yield such a trajectory) is generated such that it satisfies a configurable set of requirements, including, for example, that the vehicle position remain within a safe driving corridor of the roadway, that the vehicle sideslip angle not exceed the safe limit of vehicle handling, that tire friction forces not exceed a surface friction-limited value, and others. Note that by permitting the trajectory to satisfy locations within a corridor, rather than the more stringent, yet more arbitrary, locations along a (essentially zero width) path, the controller avoids restricting its solution to one particular path and instead iteratively calculates the optimal trajectory within the corridor at every sampling time step. The control inputs can be associated with one or multiple actuators, such as active steering, active braking, and others. The predicted vehicle trajectory and associated control inputs may be generated via constrained optimal control, which leverages efficient optimization methods and constraint-handling capabilities. In particular, model predictive control techniques may be used to generate a set of optimal trajectories and associated control inputs, etc. It should be understood that trajectory is used herein to mean a sequence of vehicle states, including its position, velocity, sideslip and yaw angles, etc.

At successive discrete sampling instants, the predicted vehicle trajectory and predicted control inputs are analyzed by a threat assessor 108 to quantify the threat to the vehicle by computing a configurable metric, such as the maximum lateral acceleration, sideslip angle, or roll angle over the trajectory, the minimum proximity to obstacles, or other metrics. Generation and use of this threat assessment metric is discussed in more detail below, and is a focus of inventions described herein. Threat may be more formally considered to be a hierarchical combination of obstacle avoidance, stability-critical states, inputs, etc, based on a model of the vehicle.

Figure 2:
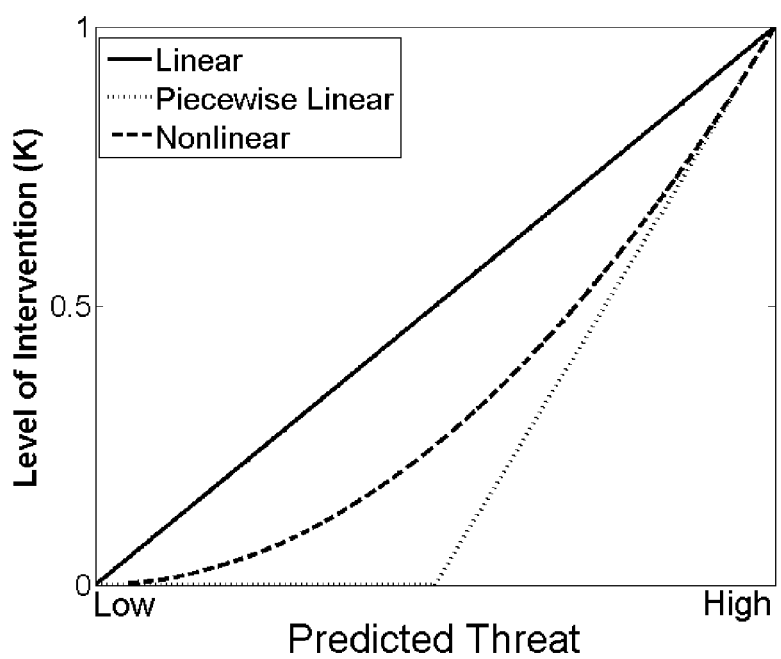
FIG. 2 graphically shows an example of various potential intervention laws based on threat metric calculation.

In the case of a semi-autonomous system, the control authority exerted by the system can then be determined as a function of this generated threat: generally speaking, if the threat metric value is low, the control system intervention is low (i.e. the driver commands the vehicle with little or no computer-controlled intervention); if the threat metric value is high, the control system intervention is high. The form of the intervention law modulating this control system authority is configurable and can differ for different actuators (i.e. a vehicle with both active steering and braking can have distinct intervention laws defined for the steering actuator and the braking actuators). The intervention law can also be defined to adapt to driver performance based on an assessment of driver skill, and/or to include considerations for driver preference, environmental conditions, previous threat metric values, previous control inputs, and other factors. FIG. 2 shows, schematically, examples of various potential intervention laws, showing, from top to bottom, linear, smooth and threshold-shaped intervention laws that depend only on predicted threat. The vertical axis represents the degree of control authority given to the active navigation and control system while the horizontal axis represents the predicted threat, with cause for intervention increasing from left to right.

In the system described above, as the threat metric value increases, indicating that the predicted vehicle trajectory will near a pre-defined critical vehicle state(s) (such as spatial location, lateral acceleration, or tire friction saturation), the control system begins to assume control authority to preempt an unsafe maneuver. As the threat metric decreases, the controller's authority phases out. In this manner, the system can be said to be both predictive and semi-autonomous.

Note that in extreme cases, when the driver does not perform an appropriate corrective action, it is conceivable that a required hazard avoidance maneuver will reach vehicle handling limits. To account for such scenarios, the intervention law can be designed such that it assumes full authority by the time the predicted safe trajectory reaches the limit of any pre-defined critical vehicle states. This corresponds to a situation where only an optimal set of inputs would result in a safe vehicle trajectory.

Figure 3A:
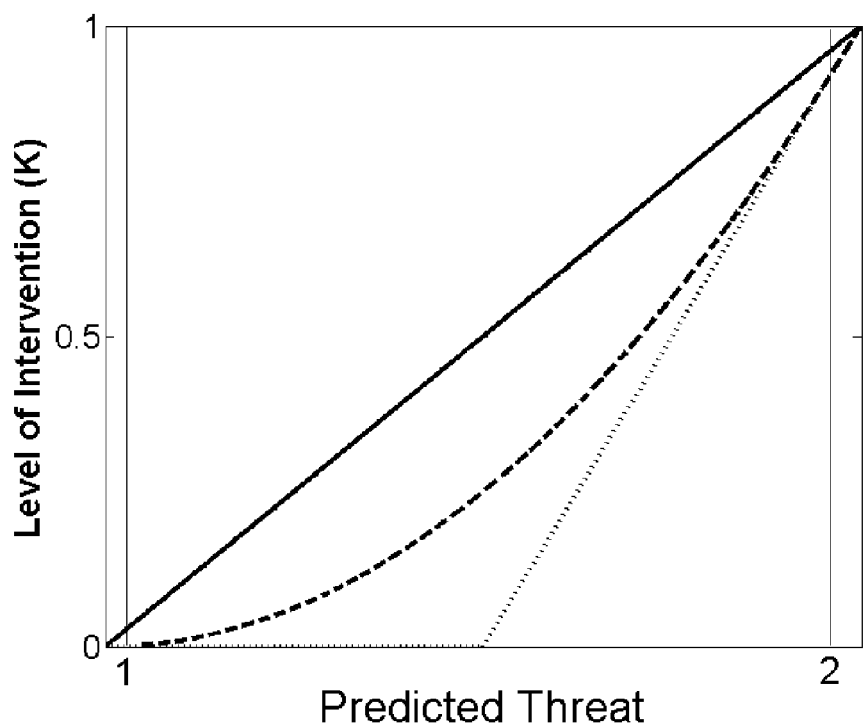
FIGS. 3a and 3b graphically show an obstacle avoidance scenario illustrating different stages of intervention for an inattentive driver, with FIG. 3a showing the different levels of intervention, and FIG. 3b showing the relative locations of the host vehicle and the environment.
Figure 3B:
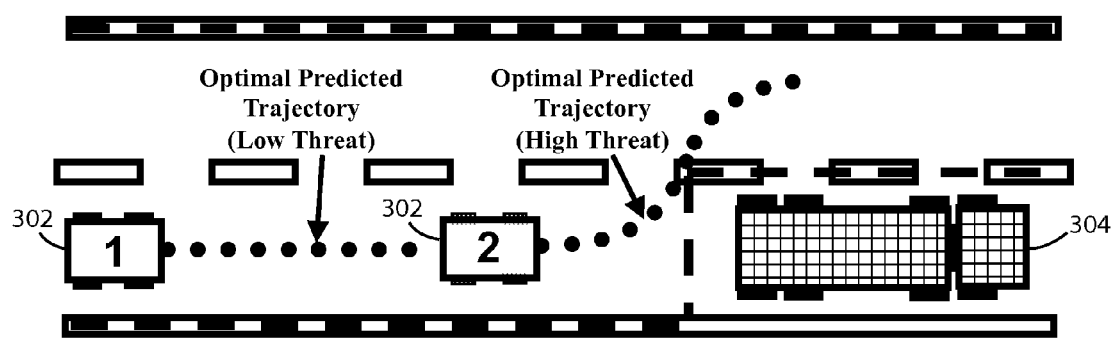

FIG. 3 shows schematically an obstacle avoidance scenario illustrating different stages of intervention for an inattentive driver. Initially, the host automobile 302 is at location 1. No obstacles are in view, and the optimal predicted trajectory is a straight path. The predicted threat is at a low level, indicated by the vertical line designated 1, near to the left hand side, which represents low threat. As the vehicle 302 advances along the roadway to the location 2, it comes nearer to a truck 304, whose velocity is either zero, or much less than that of the host vehicle 302. The sensors sense the proximity of the obstacle vehicle 304, and generate a threat metric that is larger, as at the vertical line designated 2, near the right hand limit of the threat scale. The optimal predicted trajectory assumes a curved shape, to avoid the obstacle 304. Simultaneously, the level of intervention K, increases (as shown by each of the three different intervention laws) so that, in a semi-autonomous system, the controller would take more and more control, the nearer to the obstacle the host vehicle 302 comes. In other systems, the controller may take different countermeasures, such as initiating a warning, priming brakes, seatbelts, or airbags, and/or engaging active systems, etc.

Figure 4:
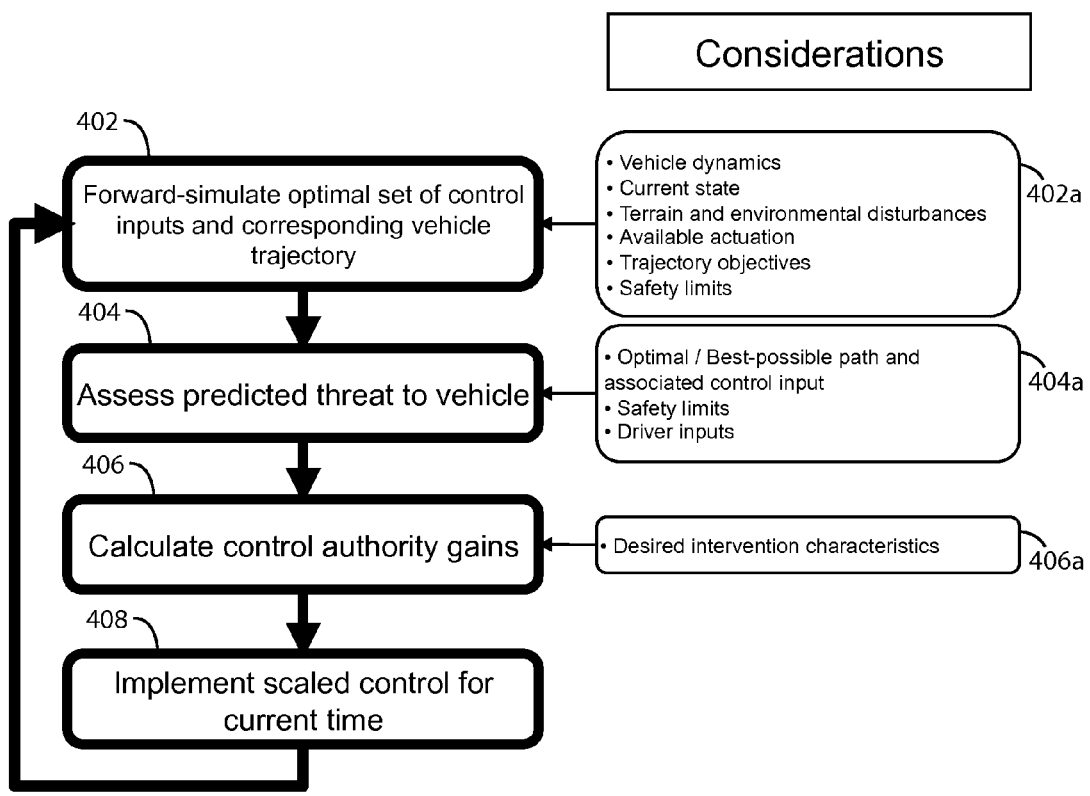
FIG. 4 shows, in flowchart form, basic steps of a method of threat assessment and semi-autonomous control, with possible considerations at each step.

FIG. 4 shows, schematically, in flow chart form, a basic flow of steps performed by a controller of an invention described in the Semi-Autonomous applications, above, with possible considerations at each step.

An initial step 402 generates an optimal set of control inputs and corresponding vehicle trajectory by forward simulation. Considerations 402a for this step include, for example, (but are not limited to) the vehicle dynamics, current state of the vehicle and environment, terrain and environmental disturbances, available actuation, trajectory objectives, safety limits, and driver inputs.

A next step is to assess 404 the predicted threat to the vehicle. General considerations 404a for this step include characteristics of the optimal path and associated control input, safety limits and driver inputs. The method of threat assessment is discussed below in more detail in connection with FIG. 8.

Returning to a brief discussion of a semi-autonomous system, a next step is to generate D06 control authority gains, with a major consideration D06a at this stage being the desired intervention characteristic. The next step D08 is to implement the scaled control for the current time.

Figures 5A, 5B, 5C:
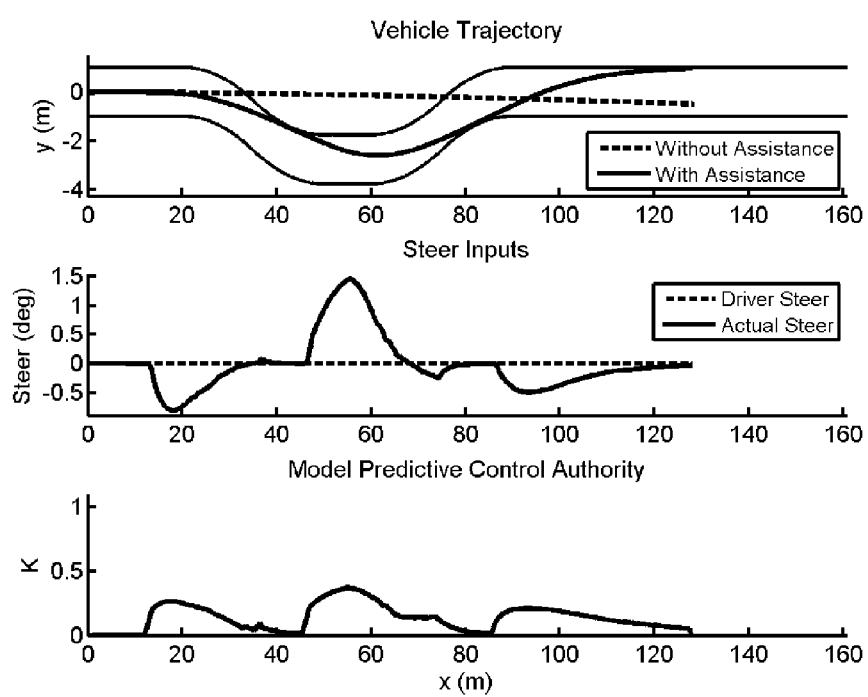
FIGS. 5a, 5b and 5c show, graphically, a simulated test illustrating system response when driver fails to navigate a curve in the road, as shown schematically in FIG. 5a, with steering angle shown in FIG. 5b and control authority K shown in FIG. 5c, where K represents the proportion of control authority given to autonomous system, with the driver allowed the remaining (1-K)

Simulation studies have been conducted. They are presented here to show how the threat assessment metric might be used to govern the level of assistance provided to a human operator. FIGS. 5a, 5b and 5c show, graphically, the results of a simulated test illustrating system response when a driver fails to navigate a curve in the road, shown by in FIG. 5a by a pair of lines. The trajectory that the driver would have followed without assistance is shown dashed. Note that it leaves the roadway. With assistance, it is shown solid black and remains within the roadway. Note that here, K represents proportion of control authority given to the autonomous system, with the driver allowed the remaining (1-K). The middle graph, FIG. 5b shows the steer inputs, with the dashed line corresponding to the driver and the solid curve corresponding to the control system. The lower graph, FIG. 5c, shows the control authority given to the autonomous system, in this case, steering, with the degree varying with distance (x) along the horizontal scale.

Figures 6A, 6B, 6C:
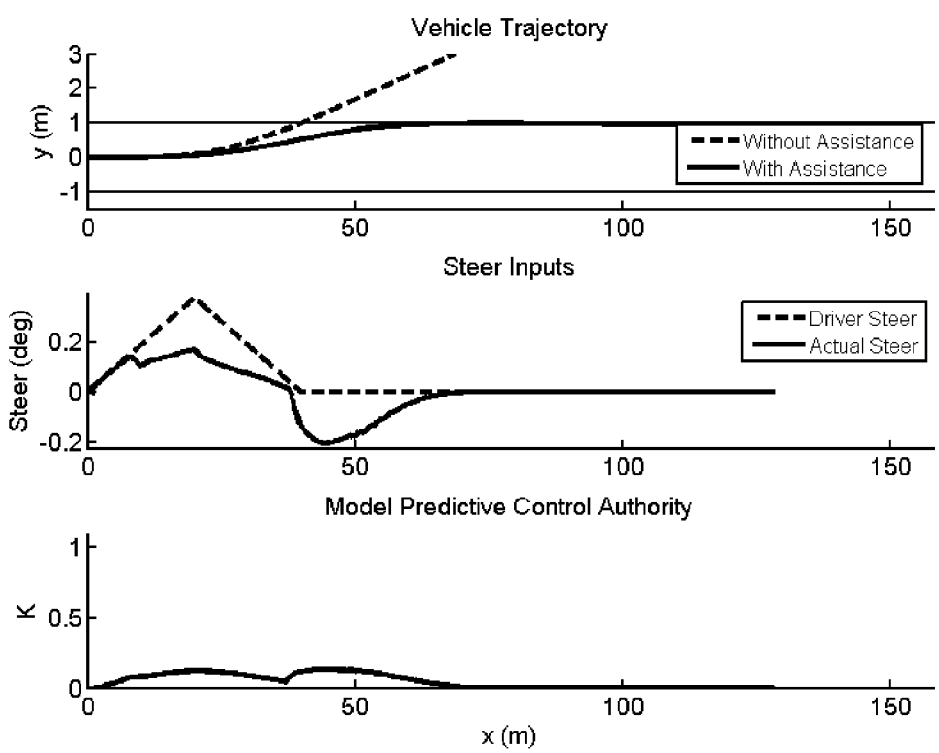
FIGS. 6a, 6b and 6c show, graphically, a simulated test illustrating system response to an erroneous driver swerve, as shown schematically in FIG. 6a, with steering angle shown in FIG. 6b and control authority K shown in FIG. 6c, where K represents the proportion of control authority given to autonomous system, with the driver allowed the remaining (1-K)

FIGS. 6a, 6b and 6c show, graphically, the results of a simulated test illustrating the system response to an erroneous driver swerve. Again, K represents proportion of control authority given to autonomous system, with the driver allowed the remaining (1-K). The same line types as above correspond to the driver without assistance (gray dashed) and with assistance (solid line). The safe roadway corridor is shown in FIG. 5a by a pair of light solid lines in the upper graph. Distance is shown along the horizontal scale. The assisted trajectory remains within the safe roadway.

Figure 7A:
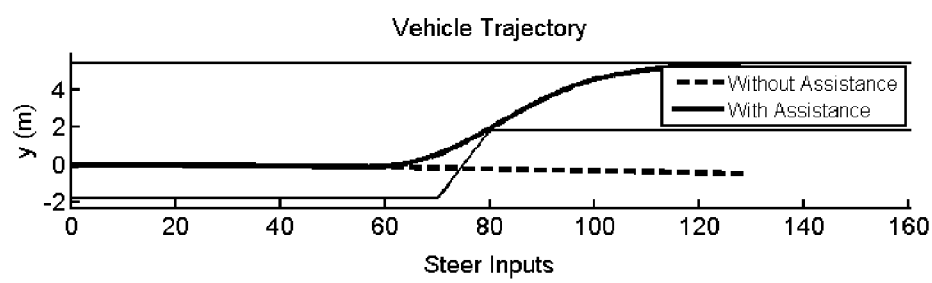
FIGS. 7a, 7b and 7c show, graphically, a simulated test illustrating system response when driver fails to anticipate/avoid obstacle, as shown schematically in FIG. 7a, with steering angle shown in FIG. 7b and control authority K shown in FIG. 7c, where K represents the proportion of control authority given to autonomous system, with the driver allowed the remaining (1-K)
Figure 7B:
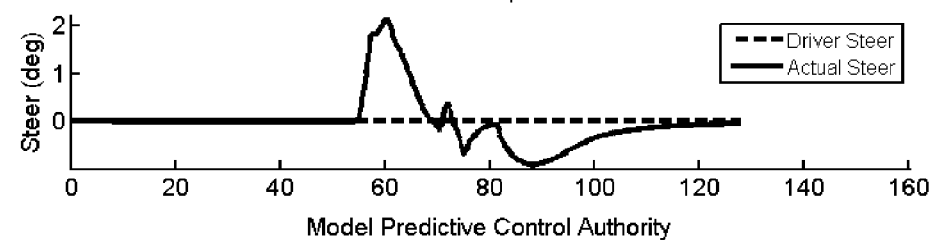
Figure 7C:
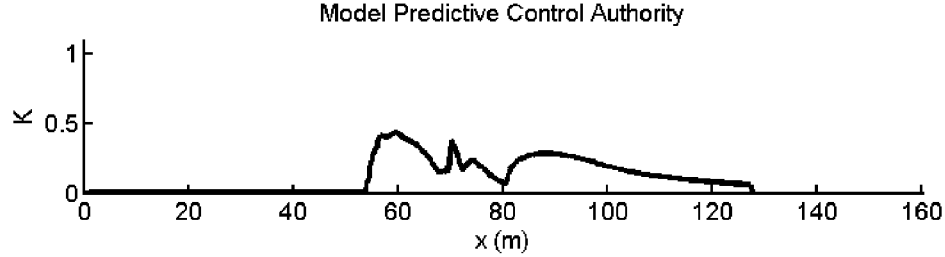

FIGS. 7a, 7b and 7c show, graphically, a simulated test illustrating system response when a driver fails to anticipate/avoid an obstacle, similar to the scenario illustrated above with respect to FIGS. 3a and 3b. Again, K represents the proportion of control authority given to autonomous system. The obstacle is simulated by a jog in the light line that represents one edge of the safe roadway. The only inputs used in this simulation are, again, steering of the driver and the autonomous system.

Significant advantages stem from the predictive nature of this solution. In addition to considering past and current vehicle and driver actions to assess threat and determine control authority, the solution generated by the present inventions predicts a future vehicle trajectory and associated threat, and uses this prediction to schedule control authority.

This predictive nature also allows for a more accurate assessment of threat than is otherwise possible. While other threat assessment metrics rely largely on physics-based calculations, the metrics used in the inventions disclosed herein can derive from sophisticated physics based vehicle and environmental models. These models yield very accurate threat assessments by considering the effects of terrain conditions, environmental disturbances, and physical limitations of vehicle actuators. These models can also assess threat for more complex vehicle trajectories than is possible with simplified models.

Threat assessment techniques disclosed herein, and uses within a system as described herein provide improved modularity and adaptability when compared to previous methods and apparati. Aspects of this improved modularity are discussed in more detail below. The underlying control framework can accommodate multiple actuation modes and vehicle models, allowing for ready application of the system to various vehicle types and actuator configurations. The system's intervention law is also readily adapted (i.e. it can change over time based on an assessment of driver skill, driver preference, environmental conditions, previous threat metric values, previous control inputs, and other factors). These adaptations can be performed either statically or dynamically.

DETAILED DISCUSSION OF THREAT ASSESSMENT

Turning now to a more detailed discussion of threat assessment techniques, first, the methods will be described generally, with the aid of a block diagram, and then a more detailed mathematical basis will be provided.

Gauging threat, using metrics based on predicted vehicle state evolution within a region/corridor is novel. This includes threat assessment based on a trajectory that remains within that corridor, along with semi-autonomous control necessary to keep the vehicle within the safe corridor. Various threat assessment methods exist. Some are based on a predicted and/or optimal vehicle trajectory. However, none use a region or corridor of safe travel to characterize the trajectory. By corridor, it is generally meant a portion of physical space, such as the width of a roadway, or a roadway and adjoining break down lane. By region, it is generally meant a region in N-space, in which two of these N dimensions may be the two spatial dimensions of the roadway's width and length, and other dimensions may be states and/or control inputs of the vehicle, such as sideslip angle, yaw angle, velocity, steering angle, etc. This leads to significant difference in performance of the two general approaches. The simple path-based approach of the prior art is suited only to warn or selectively replace a human operator. The corridor/region approach described herein may warn, supplement, or act in conjunction with a human operator, as well as replace.

Figure 8:
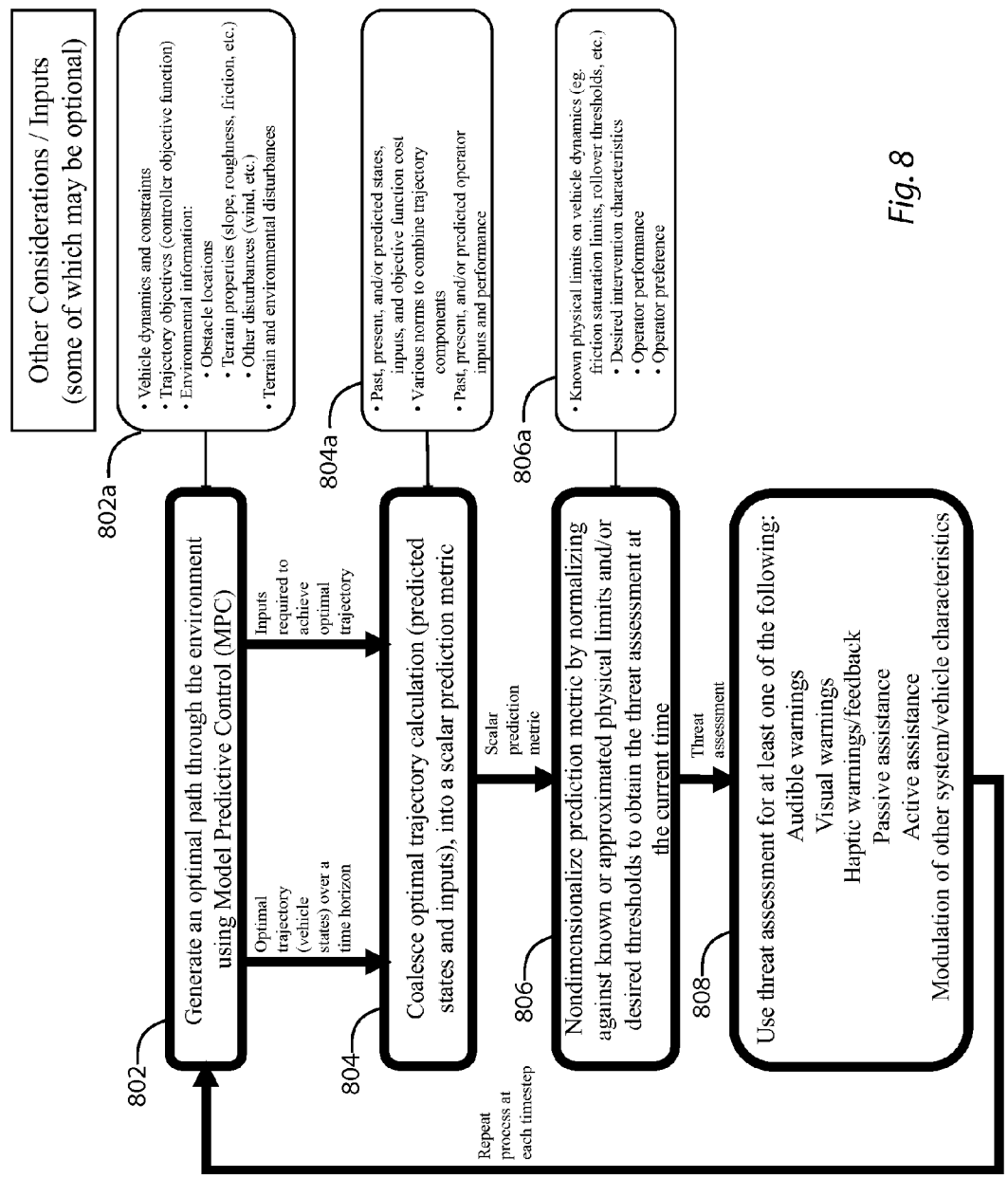
FIG. 8 shows, in flow chart form, steps of a method of an invention hereof for assessing threat, with additional considerations associated with some of the steps.

Turning now to FIG. 8, a representative process for assessing threat is described. The steps about to be described, 802-808, are all conducted at each time step of conducting a model predictive control operation. An optimal path is generated 802 through an environment, using model predictive control techniques. Considerations 802*a* that are taken in conjunction with this step may include, but are not limited to: vehicle dynamics and constraints, trajectory objectives (controller objective function), terrain and environmental disturbances and environmental information, such as: obstacle locations, terrain properties (slope, roughness, friction coefficient, etc.) and other disturbances (such as wind). It is through these considerations of vehicle dynamics and constraints and obstacle locations, that the corridor aspects of this method of threat assessment enters. Trajectory objectives more broadly describes the penalties applied to violating constraints and/or approaching unstable states and shapes what an optimal solution looks like within the corridor.

The model predictive controller generates an optimal trajectory, which constitutes an optimal sequence of inputs and the corresponding set of optimal vehicle states over a time horizon. These outputs are generated by the MPC unit, based on analysis of the models of the vehicle and the environment, using model predictive control over a time horizon, as discussed in more detail below.

It is to be noted that threat assessment methods disclosed herein operate on an optimal (sometimes referred to herein and the literature as best case, or benchmark) trajectory that was generated to remain within a constraint bounded, traversable, corridor, while maximizing vehicle stability. Prior art path based methods use a desired trajectory. The difference between optimal and desired, is that a desired path gives a rather inflexible and in some cases, arbitrary goal state to which the driver will be forced to adhere or risk setting off warning indicators or controller intervention, while the optimal trajectory gives an indication of the threat posed to the vehicle and a backup plan in case the human operator doesn't keep the vehicle within the traversable corridor him/her self.

Consider a situation in which, for example, a driver diverges from a lane centerline (the desired path for prior-art systems). While a path based system will try and pull the driver back, inventions disclosed herein will re-compute a new trajectory that may be completely satisfied by staying off the centerline, as long as the vehicle is within the corridor.

The optimal trajectory, of predicted states and predicted vehicle control inputs, over a time horizon, is next coalesced 804 to generate a scalar prediction metric. Considerations 804*a* that contribute to the step of generating a scalar metric may include but are not limited to: past, present and/or predicted states, inputs and objective function costs. Various norms (discussed below) may be used to combine trajectory components into this scalar. Past present and/or predicted operator inputs and performance may also, but need not be taken into account.

The result of the coalescing step 804 is a scalar prediction metric. This scalar can be non-dimensionalized 806 by normalizing it against known or approximated physical limits and/or predetermined desired thresholds to obtain a threat assessment at the current time. Suitable candidates for such thresholds include, but are not limited to maximum sideslip angle before loss of control, maximum load transfer before wheel liftoff, maximum lateral acceleration before skidding, maximum longitudinal acceleration before skidding, maximum total acceleration before skidding, maximum steer angle before actuator saturation, maximum available acceleration torque, and maximum available braking torque.

Considerations 806*a* that may be taken into account include, but are not limited to known physical limits on vehicle dynamics (e.g. friction saturation limits, rollover thresholds, etc), desired intervention characteristics, operator performance and operator preference.

The result of the non-dimensionalizing step 806 is a threat assessment, which can then be used for one or more of a variety of mutually consistent threat response functions, depending upon the system configuration. The threat assessment can be used to generate a warning, which may be perceptible by any human sense, including audible, visual, haptic and olfactory. The threat assessment can also, or alternatively, be used to trigger assistance, which may be passive, or active, as discussed above, and, if active, to varying degrees, depending on autonomy considerations. The threat assessment may even be used to modulate other system or vehicle characteristics.

Examples of passive assistance in the context of vehicular control include, but are not limited to: resistance torques on steering wheel, traction control, anti-lock braking systems. Examples of active assistance include, but are not limited to adaptive cruise control, yaw stability assistance Electronic Stability Control (ESC) lane keeping assistance, obstacle avoidance. Modulation of other system characteristics may include but are not limited to: seatbelt pretensioning, brake priming, suspension modifications (active suspensions, suspension stiffness modifications, etc.). Examples of semi-autonomous (a form of active assistance) assistance include, but are not limited to partial control of the steering and braking commands sent to the vehicle. Examples of autonomous assistance include, but are not limited to, full control of one or more vehicle actuator such as wheel steering angles, braking torques, acceleration torques, etc.

Each of the foregoing steps, from the step 802 of generating an optimal path, through using 808 the threat assessment to initiate a threat response, such as to take some action, if need be, is conducted at each iteration of the Model Predictive Control operation, which repeats at a frequency tailored to the particular process under control. For instance, in a representative automobile control system, the MPC routine has been conducted 20 times per second, (each timestep requiring 50 millisecond to compute). Of course, different applications with different hardware and even different vehicle models have drastically different parameters.

Turning now to more formal considerations, Model Predictive (MPC) (or receding horizon) Control is a family of finite-horizon optimal control schemes that iteratively minimizes a performance objective defined for a forward-simulated plant model subject to performance and input constraint. Stated another way, MPC uses a model of the plant to predict future vehicle state evolution and optimize a set of plant control inputs such that this prediction satisfies constraints and minimizes a user-defined objective function.

Model predictive control has a number of significant properties that make it particularly well suited to threat assessment for use with, for instance, autonomous and semi-autonomous vehicle navigation problems. Its ability to explicitly consider environmental, performance and actuator constraints enables corridor-based navigation and allows it to operate near the limits imposed by those constraints. This environmentally aware prediction, coupled with an objective-function-optimal control law, has been shown to closely mimic the performance of a human driver. Some implementations use a finite prediction horizon, which fits naturally with and may be based on the information provided by finite-horizon, forwardlooking sensors. Additionally, the model-based nature and multivariable-compatibility of the control calculation allows MPC to account for and easily adapt to structural changes and actuator availability from one vehicle model and/or loading configuration to the next. This adaptability may allow for reduced-cost controller implementation across product families and through ever-shifting safety requirements.

Finally, MPC's predictive nature allows the innovative use disclosed herein of certain constrained configurations to automatically plan a path within a partitioned environment without requiring any pre-defined vehicle trajectories. That is, where other control methods require a specific pre-planned path through the environment (which is often planned by a separate and suboptimal system), MPC can be configured to according to inventions disclosed herein, to plan its own, optimal, path given a set of situational position constraints. The path thus planned through the (pre-delineated) safe operating environment potentially offers a number of advantages over alternative trajectory planning methods; not only is it explicitly aware of vehicle dynamics, measured disturbances, and actuator limitations, but the constraint-satisfying trajectory plan it generates is feasible, since it is obtained from an already-generated set of control inputs. It is also optimal, with respect to some performance metric such as minimum lateral acceleration over a future time horizon, minimum wheel slip, etc. In the semi-autonomous framework described below, this optimal prediction can serve not only as a optimal trajectory plan, but also as an effective threat assessor.

At each time step, t, the current plant state is sampled and a cost-minimizing control sequence spanning from time t to the end of a control horizon of n sampling intervals, t+nΔt, is computed subject to inequality constraints (which establish the safe travel corridor). The first control element of this input sequence is implemented at the current time and the process is repeated at subsequent time steps. A state sequence spanning the same time period is also generated. No known MPC process uses elements of either of these sequences, after it has identified the single control input element for the current time. Only that single, current control input element is used. Inventions disclosed herein use these subsequent elements of one or both the state and control sequences to assess threat to which the device is (or may in the future be) exposed.

The optimal-control-based method that uses sensor information (and corresponding corridor boundaries) to generate controller inputs also enables generation of a metric for analyzing the threat posed to the device by a given scenario. This metric is comparable to and in many situations more useful/accurate than existing metrics because it is based solely on known or approximated physical limits of the environment and a (generally very accurate) model of the vehicle.

In contrast to known methods of threat assessment used in the prior art, threat assessment methods and apparati, as disclosed herein, generating instantaneous threat from an MPC-derived optimal avoidance trajectory inherently considers multiple hazards, actuator limitations/effects, measured disturbances, and (using nonlinear MPC), variable vehicle velocities and accelerations. Configuring the controller to plan a (sideslip-minimizing) trajectory within a safe region of travel ensures that the MPC-based threat assessment provides a true assessment of the minimum instantaneous threat posed to the vehicle. In a driver warning context, threshold threat values may trigger driver warnings at critical/desired threat thresholds. For semi-autonomous control via computer control, threat assessment may be used to determine when and how strongly to intervene. The latter application is a topic of the Semi-Autonomous applications. This disclosure focuses on the design and development of the threat assessment metric itself.

A corridor-based trajectory-planning method may be used, based on constrained optimal control. When the objective function and constraints are defined as described below, the vehicle path calculated at each time step by the MPC controller is assumed to be the best case or safest path within a corridor through the environment. Some key metrics from this prediction may be used to assess the instantaneous threat posed to the vehicle.

For a discrete plant model described by $$x_{k+1} = Ax_k + B_u u_k + B_v v_k$$

$$y_k = Cx_k + D_v v_k$$

with x, y, u, and v representing states, outputs, inputs, and disturbances of the system respectively, a quadratic objective function over a prediction horizon of p sampling intervals is defined as $$J_k = \sum_{i=k+1}^{k+p} \frac{1}{2}(y_i - r_i)^T R_y (y_i - r_i) + \sum_{i=k}^{k+p-1} \frac{1}{2} u_i^T R_u u_i + \sum_{i=k}^{k+p-1} \frac{1}{2} \Delta u_i^T R_{\Delta u} \Delta u_i + \frac{1}{2}\rho_\epsilon \varepsilon^2$$

where $R_y$, $R_u$, and $R_{\Delta_u}$ represent diagonal weighting matrices penalizing deviations from $y_i = r_i$, and $u_i = 0$, $\rho_\epsilon$ represents the penalty on constraint violations and $\epsilon$ represents the maximum constraint violation over the prediction horizon p. Inequality constraints are defined as:

$$y^j_{min}(i) - \epsilon V^j_{min}(i) \leq y^j(k+i+1|k) \leq y^j_{max}(i) + \epsilon V^j_{max}(i)$$

$$u^j_{min}(i) \leq u^j(k+i+1|k) \leq u^j_{max}(i)$$

$$\Delta u^j_{min}(i) \leq \Delta u^j(k+i+1|k) \leq \Delta u^j_{max}(i)$$

$$i = 0, \ldots, p-1$$

$$\epsilon \geq 0$$

where the vector Δu represents the change in input from one sampling instant to the next, the superscript "(•)$^j$" represents the jth component of a vector, k represents the current time, and the notation (•)j(k+i|k) denotes the value predicted for time k+i based on the information available at time k. The vector V allows for variable constraint softening over the prediction horizon, p, when $\epsilon$ is included in the objective function.

For reference trajectory tracking along a geometrically simple path, lateral deviation of the vehicle's center of gravity ($y_r$) from the corridor centerline ($r_y$) is penalized by including $R_y > 0$ in an objective function of the form:

$$J_k = \sum_{i=k+1}^{k+p} \frac{1}{2}(y_i - r_i)^T R_y (y_i - r_i) + \sum_{i=k}^{k+p-1} \frac{1}{2} u_i^T R_u u_i + \sum_{i=k}^{k+p-1} \frac{1}{2} \Delta u_i^T R_{\Delta u} \Delta u_i$$

where, k represents the current moment in time, p represents the number of time steps in the prediction horizon, $R_y$, $R_u$, and $R_{\Delta_u}$ represent weighting matrices on the lateral position state (y), inputs (u), and input rates (Δu). The resulting trajectory-tracking setup of a prior art controller and threat assessor, through a hazard-containing environment may then be illustrated by FIG. 9a.

FIG. 9a shows a vehicle 902a that seeks to avoid an obstacle of another vehicle 904a and a pedestrian 906a. A path based controller and threat assessor would attempt to follow a desired single track path $y_{des}$. This path may safely navigate the hazards, but it is unnecessarily restrictive.

For corridor-keeping, penalties on deviation from a desired trajectory ($R_y$) are replaced with lateral position constraints. This form of corridor-based navigation assumes that the environment has been delineated, with the boundaries of the navigable road surface at each time step described by the constraint vectors $$y^y_{max}(k) = \begin{bmatrix} y^y_{max}(k+1) \\ \vdots \\ y^y_{max}(k+p) \end{bmatrix}, y^y_{min}(k) = \begin{bmatrix} y^y_{min}(k+1) \\ \vdots \\ y^y_{min}(k+p) \end{bmatrix}.$$

In the preceding expression, $y^y_{max}$ and $y^y_{min}$ represent the upper and lower limits on the vehicle lateral position (y) as illustrated in FIG. 9b. The driveable corridor 908b is between these limiting curves. These limits exclude more than simply off-road/out-of-lane regions from the navigable corridor—they also extend to stationary and/or moving hazards in the roadway such as debris, pedestrians 906b or other vehicles 904b. Thus, a hazard in the roadway looks to the controller like a constriction in the corridor as illustrated by the arrows C in FIG. 9b. The host vehicle 902b is permitted to travel anywhere within the corridor 908b.

For the constraint space to remain feasible $$y^y_{max} - y^y_{min} > 0$$

Constraints can be softened by including the magnitude of their violation ε in the objective function, which takes the form $$J_k = \sum_{i=k+1}^{k+p} \frac{1}{2} y_i^T R_y y_i + \sum_{i=k}^{k+p-1} \frac{1}{2} u_i^T R_u u_i + \sum_{i=k}^{k+p-1} \frac{1}{2} \ddot{\Delta u}_i^T R_{\ddot{\Delta}u} \ddot{\Delta u}_i + \frac{1}{2} \rho_y \varepsilon_y^2,$$

$$R_{yy} = 0.$$

The MPC objective function can be configured to force the constrained optimal solutions to satisfy corridor constraints before minimizing front wheel sideslip. This hierarchy of objectives is achieved by setting constraint violation weights ($\rho_\varepsilon$) significantly higher than the competing minimization weight ($R_{aa}$) on front slip. Then when constraints are not active, front wheel sideslip—and the corresponding threat—remains low. When the solution is constrained, predicted front wheel sideslip increases with the severity of the maneuver required to remain within the navigable corridor.

Physical limits on tire cornering friction dictate maximum safe angles of wheel sideslip. These angles provide an objective limit against which predicted sideslip may be normalized; when predicted threat approaches this known limit, loss of stability is imminent. This inherent limitation on stability-critical states such as front wheel slip makes them particularly well suited as objective threat assessors.

Various norms may be used to reduce the vector of MPC predicted vehicle states $\vec{x}$ to a scalar threat metric $\Phi_{\vec{x}}(k)$ (instantaneous threat assessment at time k). The performance of several norms has been studied. Table 1 describes how each was determined.

TABLE 1

Norms used to reduce MPC predicted states to a scalar threat metric $\Phi_{\vec{x}}(k)$

| Symbol | Description | Calculation |
| --- | --- | --- |
| $\Phi_{\vec{x}}^0(k)$ | First / nearest predicted x | $\Phi_{\vec{x}}^0(k) = \|x_{k+1}\|$ |
| $\Phi_{\vec{x}}^1(k)$ | Average predicted state $\vec{x}$ | $\Phi_{\vec{x}}^1(k) = \left\| \dfrac{\sum_{i=1}^{p}(x_{k+i})}{p} \right\|$ |
| $\Phi_{\vec{x}}^2(k)$ | 2-Norm of predicted state $\vec{x}$ | $\Phi_{\vec{x}}^2(k) = \sqrt{\dfrac{\sum_{i=1}^{p}(x_{k+i})^2}{p^2}}$ |
| $\Phi_{\vec{x}}^\infty(k)$ | Maximum predicted state $\vec{x}$ | $\Phi_{\vec{x}}^\infty(k) = \max\|\vec{x}\|$ |

(Note that the superscripts in the Symbol column does not represent a power, but is part of the name, i.e, the first norm, the $2^{nd}$ norm, the infinity norm.) Additional norms that may be used include Root Mean Square of predicted state or states over the prediction horizon, and any of the above mentioned norms, with weighting profiles, over the prediction horizon (i.e. state predictions at a chosen time, for instance, closer to the current vehicle state may be weighted more heavily in the aggregate metric than predicted states at later times or at times other than the specifically chosen time. The chosen time may be other than the current time, such as a time immediately after some other event).

Just as various vehicle states may be penalized in the objective function without significantly changing the MPC-generated trajectory plan (as discussed above), these states may also be used somewhat interchangeably to assess threat posed by a given trajectory prediction. Threat assessment based on lateral acceleration ($\vec{x} = \ddot{\vec{y}} \equiv \vec{a}_y$), front wheel slip ($\vec{x} = \vec{\alpha}$), and a modified objective function cost ($\vec{x} = \vec{J}_{SI}$) have all been compared.

While lateral acceleration is used in existing threat metrics, front wheel slip may also be used advantageously in this invention based on three observations. First, front wheel slip is directly tied to, and tends to be a good indicator of, vehicle stability and controllability by front wheel steering. Second, available surface friction places a measurable limit on how large front wheel slip angles can become before loss of control is imminent. This limit provides a useful benchmark against which threat assessments can be compared to assess maneuver stability (or nearness to instability). Finally, when the cost function's only state objective is to minimize front wheel slip (while remaining within corridor- and actuator-imposed constraints), the path prediction explicitly minimizes the very metric used to assess threat. This hierarchy of objectives—remain within the corridor while minimizing front slip as much as possible—thereby provides a "best case" or minimal-threat assessment from a dynamically-feasible maneuver.

For some scenarios, however, the controller may not completely satisfy position constraints, making a an incomplete indicator of the true anticipated threat. These scenarios may arise when complex corridors cause constraints such as maximum input value or maximum input rate to activate. In these situations, the MPC-predicted vehicle path may violate position constraints, making $\Phi_a = f(a_{predicted})$ an incomplete threat assessment since it does not capture the additional threat posed by the predicted departure from the navigable corridor. To account for such scenarios, an alternative threat metric similar to the objective function cost may be used, where $\vec{x} = \vec{J}_{SI}$, with $\vec{J}_{SI}$ defined similar to the MPC objective function.

By similar, it is meant of the same form and order. For example, the equation below shows what $J_{SI}$ might look like when the controller objective function penalizes wheel sideslip $\alpha$ by $R_\alpha$, steering angle $\delta$ by $R_\delta$, steering rate $\Delta\delta$ by $R_{\Delta\delta}$, and constraint violation by $\epsilon$:

$$\vec{J}_{SI}(k) = \frac{1}{2}R_\alpha \begin{bmatrix} \alpha_{k+1}^2 \\ \alpha_{k+2}^2 \\ \vdots \\ \alpha_{k+p}^2 \end{bmatrix} + \frac{1}{2}R_\delta \begin{bmatrix} \delta_k^2 \\ \delta_{k+1}^2 \\ \vdots \\ \delta_{k+p-1}^2 \end{bmatrix} + \frac{1}{2}R_{\Delta\delta} \begin{bmatrix} \Delta\delta_k^2 \\ \Delta\delta_{k+1}^2 \\ \vdots \\ \Delta\delta_{k+p-1}^2 \end{bmatrix} + \frac{1}{2}\rho_{SI} \begin{bmatrix} \epsilon_{k+1}^2 \\ \epsilon_{k+2}^2 \\ \vdots \\ \epsilon_{k+p}^2 \end{bmatrix}.$$

This threat metric, while somewhat more difficult to interpret physically, accounts for the additive presence of the various objective function considerations, such as constraints, input costs, etc, and increases rapidly when constraints are violated. This rate of intervention is tuned independent of the controller cost function by introducing a modified (and adjustable) constraint violation weight, $\rho_{SI}$. The cost-based prediction $\vec{J}_{SI}$ is related to the predicted front wheel sideslip by $$\vec{J}_{\vec{\alpha}} = (\vec{\alpha} - \vec{r}_{\vec{\alpha}})^T R_{\alpha\alpha} (\vec{\alpha} - \vec{r}_{\vec{\alpha}}).$$

With $\vec{r}_\alpha = 0$, this relation allows the cost-based threat assessment $\Phi_{\vec{J}_{SI}}$ to be mapped to an equivalent (and physically-bounded) front-wheel-slip-based assessment $\Phi_J$ via $$\Phi_J = \sqrt{\frac{\Phi_{J_{SI}}}{R_{\alpha\alpha}}}.$$

Simulation results conducted by the inventors hereof, but not reproduced herein, show how these prediction calculations, threat metrics, and prediction horizons affect the threat assessment. The simulations show that the MPC-based threat assessment provided by the proposed framework gives a similar, albeit more situation- and plant-aware threat assessment to that based on a constant radius turn in simple (single-obstacle avoidance) scenarios. When generated using the maximum MPC-predicted lateral acceleration (∞-norm) in these simple scenarios, these predictions provide slightly earlier warning, which explicitly accounts for more complex hazard geometry and more realistic actuator limits. In more complicated/realistic scenarios where multiple hazards are present, threat assessment provided by these inventions has been shown to provide a very accurate assessment of the true threat (or expected nearness to instability).

Assessing threat based on a controller-achievable maneuver requires some measure of how well the predicted threat/state represents what the vehicle would actually experience under autonomous control (true threat). This relationship between predicted threat and the controller's ability to maintain true threat at or below this level plays an important role in the semi-autonomous control implementation discussed in the Semi-Autonomous applications. Threat assessments using various controller and prediction parameters have been compared by the inventors hereof to the true vehicle state and have been shown to provide a reliable estimate of the vehicle's true states under autonomous control.

When hazard geometry is simple, the threat assessment generated by methods disclosed herein closely mirrors and slightly precedes (gives more time to prepare for than) a constant radius turn-based assessment. For more complex hazard avoidance scenarios, such as those requiring a lane change maneuver, methods described herein are shown to account for the increased threat, thus providing a significant improvement over simple constant radius turn (CRT)-based assessments.

Methods disclosed herein have been shown in these simulations to accurately predict an MPC-controlled vehicle's performance as it tracks the MPC-predicted trajectory plan through a constrained corridor. Two metrics have been shown to provide a nearly one-to-one mapping of predicted threat to true threat, suggesting that, if provided full control of a vehicle, this MPC controller can reasonably be expected to maintain critical vehicle states/threat at or below their predicted values. It is explained below why these inventions' threat assessment may be effectively used for both autonomous and semi-autonomous applications. The inventors hereof have also conducted a comparison of predictions obtained using this objective function setup to objective functions that penalizes lateral acceleration, vehicle roll angle, load transfer, and other states besides front wheel slip ($R_{a_y a_y} > 0$), with similarly favorable results.

It is also very beneficial that the threat assessment may change depending on the circumstances, for example, if a car is traveling through an area crowded with pedestrians. Such a flexibility would be based on a situational circumstance or severity. A crowded location presents a more severe situation than traveling along an open road. Thus, if there are many obstacles, or if there are several obstacles, but they are moving along complicated paths, the system may note this and invoke a different level of threat assessment, because of the complexity, or severity of the situation.

One key to these inventions' effectiveness as both a threat assessor and semi-autonomous controller is that it uses the same set of tools, calculations, and model-based predictions for assessing threat as it does for calculating inputs, and governing human and machine control commands. Rather than minimizing some arbitrary cost function or value, the trajectory predictor (and actuator command generator in the case of semi-autonomous assistance) minimizes the very characteristics that describe threat. These characteristics, in turn, are based on an accurate model of the vehicle whose performance, stability, and safety may be assessed against an objective, physics-based metric.

In one particularly useful formulation, the threat assessor combines states, inputs, and constraint violations using a weighting function, that is of the same form and order as the weighting function used by the trajectory planner and actuator command generator.

EXTENSIONS

Methods and apparati have been disclosed herein that assess threat in the context of a system with a vehicle moving through an environment. As has been mentioned above, however, these methods and apparati of threat assessment can be used with any system that can be modeled. For instance, they can be used to assess threat in connection with any human-automation system in which the performance of the system being controlled may be reasonably modeled. By performance, it is meant the trajectory of a machine, the motion, velocity or position of a tool, vehicle, etc. The methods and apparati may be used with vehicles of all sorts, including but not limited to terrestrial (ground), aerial, nautical, underwater, underground, etc. They can be used with heavy equipment, such as agricultural equipment, fork lift trucks, cranes, etc., which not only move from place to place in an environment, but also, or alternatively, change their configuration from one moment to the next, such as when a crane is extending its boom. They may be used with naval vessels. Additionally, they may be used with unmanned or remotely-operated vehicles such as unmanned aerial drones, unmanned ground robots, etc.

The methods and apparati may be used with surgical machines, which are guided by a human surgeon who manipulates an input device, to drive an output device, such as a scalpel, cauterization tool, stitching machine, etc. The environment of the surgical tool may be considered to include the body being operated upon, instrument supports, etc. They may also be used to control chemical processes, and power plants, such as nuclear, electric, etc.

The inventions disclosed herein are also useful with respect to devices that do not move from one point to another in an environment, and are also useful in connection with large systems, such as power plants, and also processes, such as chemical processes.

The terms: states, control inputs, operator inputs, trajectory, and regions, are all general to modeled systems and therefore translate directly to surgical devices, chemical processes, etc., as used herein and in the accompanying claims.

A region of the state space bounded by state constraints is also generic to modeled systems. Corridor, as used herein, is a convenient way of visualizing a two-dimensional region and may therefore not be so intuitively useful in other applications. However, it may be meant to use a bounded two-dimensional corridor in a state space that is different from a traditional, familiar two-dimensional physical space, such as that in which a vehicle travels. Thus, as used in the claims, it means a bounded two-dimensional space, analogous to a roadway in terrestrial two-dimensional space.

A system that does not move within an environment still needs to account for the influence of external processes and disturbances upon it. Although these are not obstacles per se, they still represent threats to system success. In a chemical process, such an obstacle-like threat could be an external agency that dumps chemicals at different intervals into the mixture under control, or an uncontrolled temperature variation in the environment of the plant. Regarding a chemical process, the term process plant is used herein and in the claims to refer to the volume of material that is being transformed and manipulated according to a chemical process, which may be in a stationary vessel, or moving along in a series of pipes and vessels, over time. The environment in which the process plant operates would include the vessels and atmospheres in which the process plant exists. Environmental disturbances, or hazards, could include ambient temperature influences, chemical pollutants, vibrations of equipment, etc. Rather than the locations of obstacles in physical space being relevant to the control of a process, inventions disclosed herein use the coordinates of such influences, in whatever coordinate system is relevant for understanding and evaluating their effect upon the process under control. For instance, the coordinates of chemical process hazards may relate to which vessel, or run of conduit a disturbance affects.

With respect to other systems, such as power plants, analogous factors will be understood by those skilled in the art.

As has been mentioned, use of a threat assessment that is closely tied to the means by which an optimal trajectory is established enables an optimal framework of assisting a device operator. This framework explicitly considers human and machine dynamics without presuming operator intentions or limiting the avoidance maneuver (and its associated threat assessment) to a specific path. It provides a unified framework that allows for various modes and levels of operator assistance, from operator warning to stability control to passive intervention, to active semi-autonomous control, and finally, to autonomous machine operation. Autonomous operation may be local or remote.

Remotely operated systems typically exhibit a time lag. Because this method for threat assessment and semi-autonomous operator assistance is based on a model predictive control prediction, it is particularly well suited for unmanned and remotely or 'teleoperated' systems such as Unmanned Ground Vehicles (UGV's), Unmanned Aerial Vehicles (UAV's), Unmanned Underwater Vehicles (UUV's), or remote surgical equipment. In relaying signals between the operator and the vehicle, such systems frequently experience communication latencies and time delays. These latencies and time delays can cause problems for prior art systems seeking to assist the human driver. Such systems often require additional modules to mitigate the effects of latency and time delays. In contrast, the framework described here may be configured to explicitly incorporate these time delays into the optimal trajectory prediction, thereby eliminating the need for additional modules.

Operator Assistance

Figure 10:
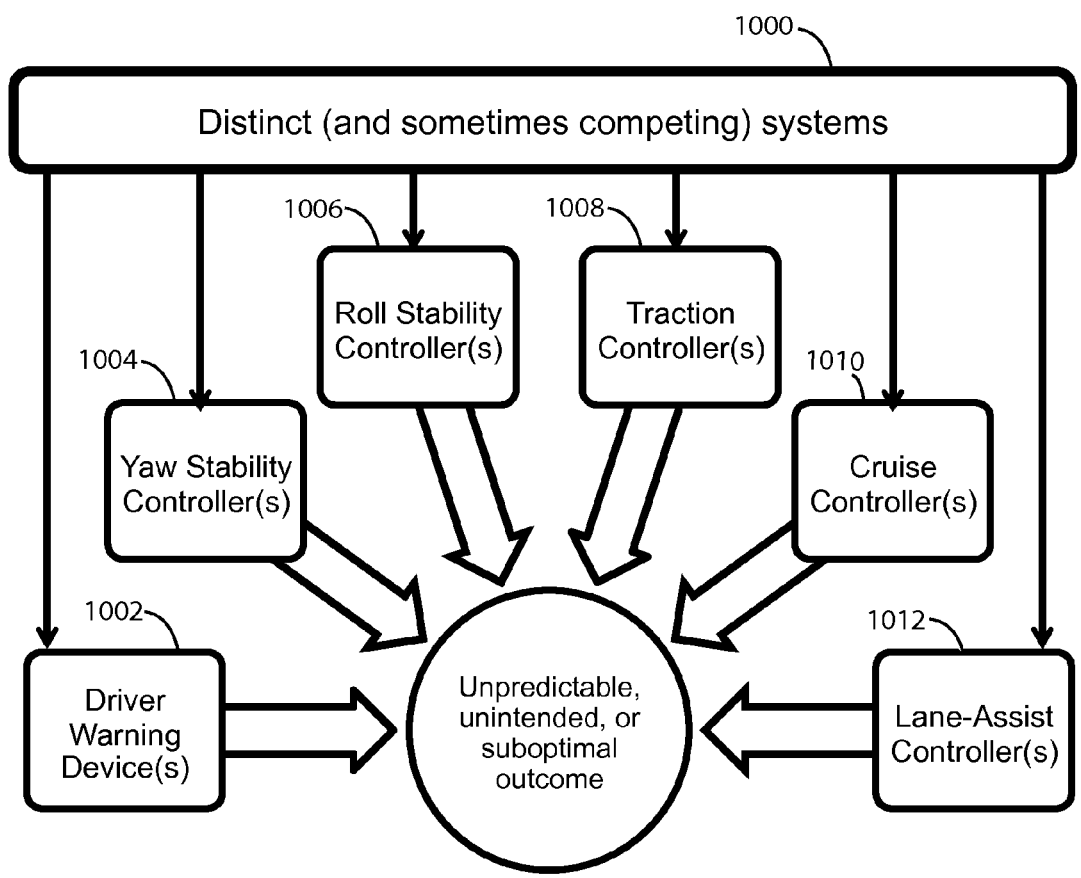
FIG. 10 is a schematic representation in block diagram form illustrating how a representative system of the prior art that can lead to poor, mutually inconsistent performance.

Known systems may be illustrated with reference to FIG. 10. Known systems use distinct and sometimes competing modules to assist an operator. Such distinct, independent systems 1000 can include, but are not limited to: warning devices 1002, a yaw stability controller 1004; a roll stability controller 1006, a traction controller 1008, a cruise controller 1010 and a lane-assist controller 1012. All of which may work independently, and their combined output, (some of which are inputs to actuators that control the vehicle) can lead to inconsistent, unpredictable, unintended or suboptimal outcome 1014. For instance, the roll stability controller may output a steering command that is inconsistent with a steering command generated by the lane assist controller.

Figure 11:
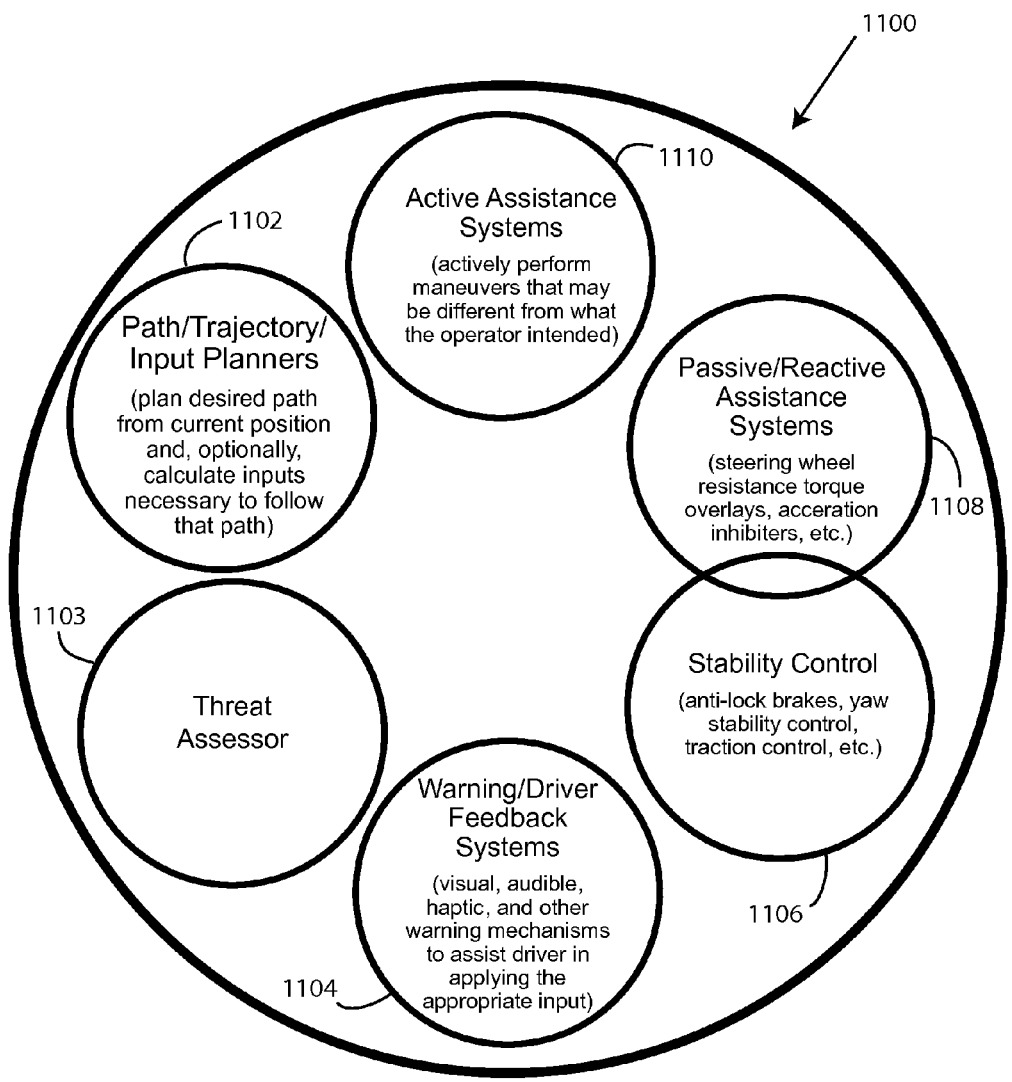
FIG. 11 is a schematic representation in block diagram form showing an array of functions performed in a unified, mutually consistent manner by inventions hereof.

In contrast, as shown in FIG. 11, the inventions described here may operate as a unitary, consistent whole, 1100, in conjunction with, or independent of, the human operator.

The MPC constitutes a state trajectory and control input planner 1102, which generates 1102 an optimal trajectory for the device, from current position through a time horizon, together with the device control inputs necessary to follow that trajectory.

In a passive mode, these inventions constitute a physically-accurate, predictive and flexible means of predicting the threat posed to the vehicle given the driver's current and past performance, current and past vehicle state evolution, and environmental features/constraints. It is physically accurate because it is based on a forward-simulated vehicle model. It is predictive, because the vehicle model is simulated over a future time horizon. It is flexible because threat and intervention decisions are based on a corridor—rather than path characteristics.

Warning and operator feedback systems 1104 may inform any of a number of operator warning devices, including audible, visual, haptic, olfactory, etc.

In addition to providing a predictive, flexible, and accurate passive warning mechanism 1104, the inventions may be configured to predictively and semi-autonomously act as a device stability controller 1106. Examples of stability controllers that this system might replace include, but are not limited to yaw stability controllers, roll stability controllers, anti-lock brakes and traction controls. Using various mutually compatible actuation modes, including, for example, differential braking and steering adjustments, this framework predicts vehicle state evolution over a projected time horizon and adjusts the current vehicle state to keep both current and predicted stability-critical states (such as yaw angle, wheel slip angles, etc.) below critical levels.

Another related intervention mode that these inventions are capable of is passive driver assistance 1108. These subsystems can apply various degrees of resistance, such as to steering wheel resistance torque overlays, braking (anti-lock brakes) traction control, yaw stability control, acceleration inhibitors, to discourage the operator from further increasing threat. (Note that there is some overlap between passive and reactive assistance systems and stability controllers.)

Active intervention modes 1110 go beyond providing resistive feedback and actively initiate steering and/or braking commands.

The inventions are well-suited to semi-autonomously assist the driver; utilizing sensory information related to the vehicle surroundings and a prediction of a safe vehicle trajectory through those surroundings to exert appropriate actuator effort and avoid impending accidents. Sensory information would include data related to nearby vehicles, pedestrians, road edges, and other salient features to assess accident threat. A second key advantage is that the invention may be configured to operate only during instances of significant threat: giving the driver full control of the vehicle in low threat situations but applying appropriate levels of computer-controlled actuator effort during high threat situations.

The corridor-based threat assessment upon which this intervention is based presents a key advantage over existing semi-autonomous safety systems in that using a corridor (as opposed to a path) allows intervention that does not unnecessarily constrain the human operator to a specific (and rather arbitrary) path.

As a semi-autonomous controller, the inventions allow for human-controlled, computer-controlled, and shared human/computer vehicle operation. The form of the intervention law modulating control system authority allocation is configurable and can differ for different actuators (i.e. a vehicle with both active steering and braking can have distinct intervention laws defined for the steering actuator and the braking actuators). The intervention law can also be defined to adapt to driver performance based on an assessment of driver skill, and/or to include considerations for driver preference, environmental conditions, previous threat metric values, previous control inputs, and other factors. The intervention law can also take on dynamics of its own, exhibiting, for example, hysteretic and higher-order behavior as a function of past, current, and predictive threat. See FIG. 1.

Finally, the inventions are capable of fully-autonomous vehicle control. That is, in high-threat scenarios or when desired by the human operator, this system can take full control of the vehicle, safely navigating it through the environment while avoiding both collisions and loss of control.

This multiplicity of highly competent options enables a unitary, integrated, mutually consistent, optimal operator assistance system. Because the modules for effectuating each degree of autonomy in operation described above are each based on the same optimal control sequence of states and inputs, and are all tied together by virtue of the threat assessment apparatus and method that is also based on the same sequence of states and inputs, the optimal set of inputs is optimal and internally consistent. The passive assistance portions of the system will not generate conflicting actuator inputs with other passive assistance portions, or with the active assistance portions. Thus, the system can allow and direct control to flow seamlessly from a mere warning, to passive assistance, stability control, active assistance, semi-autonomous and fully autonomous, and back again, over and over again, automatically. All of the threat response activities are mutually consistent. This permits a truly, reliably user configurable semi-autonomous system. All of this flexibility flows from the use of generating an appropriate and active control input based on predicted threat.

This unification through the optimal trajectory of position, control and state sequences is highly significant. It means that one system can perform equally well the duties currently assigned to many disparate systems. For example, a vehicle that was previously equipped with separate driver warning, traction control, and yaw stability control systems (whose assistance can often conflict), may, with the present inventions, perform each of these functions (and more still) with a single, unified, and in some sense optimal framework. Thus, that a single system reliably, elegantly, and highly satisfactorily performs any of these tasks individually, and all of the tasks together, which otherwise would require multiple systems is significant. Such an invention is far more than simply the sum of its parts.

It will be understood that the MPC path and trajectory planner 1102 and the threat assessor 1103 and actuator controllers 1104, 1106, 1108, 1110 may be microprocessor based such as a computer having a central processing unit, memory (RAM and/or ROM), and associated input and output buses. They may be application specific integrated circuits or may be formed of any other logic devices known in the art. They may be a portion of a central vehicle main control unit, an interactive vehicle dynamics module, a main safety controller, or may be stand=-alone controllers. They may each have associated memories, may share a central memory or some combination of both. These controllers may perform various different sensing system operations. The operations may be performed sequentially or simultaneously. The controller and threat assessor may have a driver input.

The foregoing has described the computer systems that conduct method steps discussed herein relatively generically. It will be understood by those skilled in the art that each of the processes described herein can be performed by a dedicated specialized processor, or by a properly programmed general purpose digital computer, or by some computing device that is more or less complex and specialized than either of the foregoing. As such, where in the claims it is stated that a processor performs a specific function, it will be understood that such a processor may perform only the function stated therein, or additional, and even all processes mentioned within the claim. Assignment of such processes to one or more processing devices is routine and would be conducted by a skilled person according to processing speed, weight.

This disclosure describes and discloses more than one invention. The inventions are set forth in the claims of this and related documents, not only as filed, but also as developed during prosecution of any patent application based on this disclosure. The inventors intend to claim all of the various inventions to the limits permitted by the prior art, as it is subsequently determined to be. No feature described herein is essential to each invention disclosed herein. Thus, the inventors intend that no features described herein, but not claimed in any particular claim of any patent based on this disclosure, should be incorporated into any such claim.

Some assemblies of hardware, or groups of steps, are referred to herein as an invention. However, this is not an admission that any such assemblies or groups are necessarily patentably distinct inventions, particularly as contemplated by laws and regulations regarding the number of inventions that will be examined in one patent application, or unity of invention. It is intended to be a short way of saying an embodiment of an invention.

An abstract is submitted herewith. It is emphasized that this abstract is being provided to comply with the rule requiring an abstract that will allow examiners and other searchers to quickly ascertain the subject matter of the technical disclosure. It is submitted with the understanding that it will not be used to interpret or limit the scope or meaning of the claims, as promised by the Patent Office's rule.

The foregoing discussion should be understood as illustrative and should not be considered to be limiting in any sense. While the inventions have been particularly shown and described with references to preferred embodiments thereof, it will be understood by those skilled in the art that various changes in form and details may be made therein without departing from the spirit and scope of the inventions as defined by the claims.

The corresponding structures, materials, acts and equivalents of all means or step plus function elements in the claims below are intended to include any structure, material, or acts for performing the functions in combination with other claimed elements as specifically claimed.

Having described the invention, what is claimed is:

1. A method for generating a threat response, related to threat posed to a mechanical device, comprising:
   using a computer control system, determining an optimal sequence of predicted device controller inputs based on at least a model of the device and an objective function, the optimal sequence of predicted device controller inputs being determined so as to optimize predicted performance of the model over a time horizon over which the device model is simulated and satisfy device dynamic constraints, device input constraints, and environmental constraints;
   using the computer control system, determining an optimal sequence of predicted device states resulting from applying the sequence of optimal device inputs to the model of the device;
   using the computer control system, combining at least one of: the predicted device states and the predicted device controller inputs, into a scalar threat assessment metric based at least on predicted stability of the device through the time horizon as a function of the at least one of the predicted device states and the predicted device controller inputs; and,
   using the computer control system, determining a type and degree of operator assistance to provide as the threat response based on at least the scalar threat assessment metric, and providing an actuator input based on at least the threat response to an actuator that actuates a system of the device to execute the operator assistance.

2. The method of claim 1, wherein determining the type and degree of operator assistance to provide as the threat response comprises choosing an operator assistance from a set of at least two mutually consistent threat responses, each response of the set being based on the same threat assessment metric.

3. The method of claim 1, the threat response being at least one selected from the group of mutually consistent responses consisting of:
   triggering a warning for a human device operator;
   triggering a collision prevention mechanism;
   triggering a collision mitigation mechanism;
   regulating an input of a human device operator;
   modifying an input of a human device operator;
   regulating an input of the optimal controller;
   modifying an input of the optimal controller; and
   triggering autonomous control of the device by the optimal controller.

4. The method of claim 3, the step of wherein the combining at least one of the predicted states and the predicted inputs into a scalar threat assessment metric comprises: determining a threat cost at each prediction step in the optimal sequence using a weighting function of the same form as the objective function that was used to generate a sequence of at least one optimal device state and optimal device inputs and combining the sequence of determined threat costs to generate an aggregate threat assessment metric.

5. The method of claim 4, wherein generating the aggregate threat assessment metric comprises basing the generation on at least one norm, selected from the group consisting of:
   a maximum predicted value of at least one threat cost over a prediction horizon;
   an average predicted value of at least one threat cost over a prediction horizon; and
   a Root Mean Square (RMS) of predicted value of at least one threat cost over a prediction horizon.

6. The method of claim 4, wherein generating the aggregate threat assessment metric comprises basing the generation on at least one norm, selected for the group consisting of:
   a. a maximum predicted value of at least one state over a prediction horizon;
   b. an average predicted value of at least one state over a prediction horizon;
   c. a Root Mean Square (RMS) of predicted value of at least one state over a prediction horizon;
   d. a maximum predicted value of at least one input over a prediction horizon;
   e. an average predicted value of at least one input over a prediction horizon;
   f. a Root Mean Square (RMS) of predicted value of at least one input over a prediction horizon; and
   g. a maximum predicted value of at least one input and at least one state over a prediction horizon;
   h. an average predicted value of at least one input and at least one state over a prediction horizon;
   i. a Root Mean Square (RMS) of predicted value of at least one input and at least one state input over a prediction horizon; and
   j. a weighted prediction of any of the factors of states and inputs listed in sub-paragraphs a-i of this claim, formed by weighting predictions that are at a chosen time more heavily in the aggregate threat metric than a predicted factor at a different times.

7. The method of claim 3, the warning for a human device operator comprising a signal selected from the group consisting of: an audible signal, a visual signal, a haptic signal, and an olfactory signal.

8. The method of claim 3, the humanly perceptible signal varying in at least one of frequency and amplitude based on the threat assessment metric.

9. The method of claim 3, the control assistance comprising a passive device control assistance.

10. The method of claim 3, the control assistance comprising a reactive device control assistance.

11. The method of claim 3, the control assistance comprising an active device control assistance.

12. The method of claim 10, the device comprising a ground vehicle, the active device control assistance comprising at least one selected from the group consisting of: traction control, adaptive cruise control yaw stability control, roll stability control, electronic stability control; lane keeping and obstacle avoidance.

13. The method of claim 1, the device comprising a ground vehicle, the operator assistance comprising at least one selected from the group consisting of: resistance torques on a steering input member; resistance torques on a braking input member; resistance torques on an acceleration input member; acceleration torques; braking torques; priming wheel brakes, preparing safety devices and modifying device properties.

14. The method of claim 1, the operator assistance comprising an active device modulation.

15. The method of claim 14, the device comprising a ground vehicle, the device modulation signal comprising suspension modification.

16. The method of claim 1, the device comprising a ground vehicle.

17. The method of claim 1, the device comprising an aerial vehicle.

18. The method of claim 1, the device comprising a naval vessel.

19. The method of claim 1, the device comprising heavy construction equipment.

20. The method of claim 1, the device comprising a fork lift truck.

21. The method of claim 1, the device comprising a surgical device.

22. The method of claim 1, the device comprising a tele-operated device residing in the environment, which device environment is distant from an environment in which a human device operator resides.

23. A method according to claim 1, wherein the predicted stability of the device is determined based on at least (i) spatial constraints on the plurality of predicted device states, and (ii) predicted non-spatial states of the device given the spatial constraints.

24. A method according to claim 23, wherein the device comprises a vehicle, and wherein the predicted non-spatial states of the device comprise at least one of predicted vehicle states of: longitudinal acceleration, lateral acceleration, vehicle sideslip angle, tire sideslip angle, road friction utilization, vehicle yaw rate, vehicle roll angle, vehicle roll rate, and vehicle pitch angle.

25. A method according to claim 1, wherein the device comprises a vehicle, and wherein a steering angle of the vehicle diverges from a steering angle of a human device operator based on at least the predicted stability of the device.

* * * * *

UNITED STATES PATENT AND TRADEMARK OFFICE
CERTIFICATE OF CORRECTION

PATENT NO. : 8,437,890 B2  Page 1 of 1
APPLICATION NO. : 13/254761
DATED : May 7, 2013
INVENTOR(S) : Sterling J. Anderson, Steven C. Peters and Karl D. Iagnemma It is certified that error appears in the above-identified patent and that said Letters Patent is hereby corrected as shown below:

In the Claims:

In Column 24, line 1, Claim 4, delete "the step of".

Signed and Sealed this
Ninth Day of July, 2013

Teresa Stanek Rea
*Acting Director of the United States Patent and Trademark Office*